United States Patent
Sato et al.

(10) Patent No.: US 12,198,409 B2
(45) Date of Patent: Jan. 14, 2025

(54) LEARNING METHOD, IMAGE IDENTIFICATION METHOD, LEARNING DEVICE, AND IMAGE IDENTIFICATION SYSTEM

(71) Applicant: Panasonic Intellectual Property Corporation of America, Torrance, CA (US)

(72) Inventors: Satoshi Sato, Kyoto (JP); Yasunori Ishii, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 95 days.

(21) Appl. No.: 18/089,103

(22) Filed: Dec. 27, 2022

(65) Prior Publication Data

US 2023/0134491 A1    May 4, 2023

Related U.S. Application Data

(63) Continuation of application No. PCT/JP2021/024221, filed on Jun. 25, 2021.

(30) Foreign Application Priority Data

Jul. 16, 2020    (JP) ................. 2020-122187

(51) Int. Cl.
    *G06V 10/774*    (2022.01)
    *G06T 5/60*    (2024.01)
    (Continued)

(52) U.S. Cl.
    CPC .............. *G06V 10/774* (2022.01); *G06T 5/60* (2024.01); *G06T 5/73* (2024.01); *G06V 20/70* (2022.01);
    (Continued)

(58) Field of Classification Search
    CPC ...... G06V 10/774; G06V 20/70; G06V 10/82; G06T 5/60; G06T 5/73;
    (Continued)

(56) References Cited

U.S. PATENT DOCUMENTS

| 2016/0055627 | A1* | 2/2016 | Shibata | .................. | G06F 18/28 |
| | | | | | 382/254 |
| 2019/0279026 | A1 | 9/2019 | Sato et al. | | |

(Continued)

FOREIGN PATENT DOCUMENTS

| EP | 2 696 195 A2 | 2/2014 |
| JP | 2002-049008 A | 2/2002 |

(Continued)

OTHER PUBLICATIONS

International Search Report (English Language Translation), mailed Sep. 14, 2021, by the Japan Patent Office (JPO), in International Application No. PCT/JP2021/024221, dated Sep. 14, 2021.

*Primary Examiner* — Timothy J Henn
(74) *Attorney, Agent, or Firm* — Greenblum & Bernstein, P.L.C.

(57) ABSTRACT

Provided is a learning device that acquires computational imaging information of a computational imaging camera that captures an image with blurring; acquires a normal image captured by a normal camera that captures an image without blurring or an image with blurring smaller than that of the computational imaging camera, and a correct answer label assigned to the normal image; generates an image with blurring based on the computational imaging information and the normal image; and performs machine learning using the image with blurring and the correct answer label to create an image identification model for identifying an image captured by the computational imaging camera.

12 Claims, 25 Drawing Sheets

(51) Int. Cl.
  *G06T 5/73* (2024.01)
  *G06V 20/70* (2022.01)
  *H04N 23/56* (2023.01)
  *H04N 23/72* (2023.01)
  *H04N 23/74* (2023.01)
  *H04N 23/95* (2023.01)

(52) U.S. Cl.
  CPC ............. *H04N 23/56* (2023.01); *H04N 23/72* (2023.01); *H04N 23/74* (2023.01); *H04N 23/95* (2023.01); *G06T 2207/20084* (2013.01)

(58) Field of Classification Search
  CPC . G06T 2207/20084; G06T 2207/10016; G06T 2207/10152; G06T 2207/20081; G06T 5/50; H04N 23/56; H04N 23/72; H04N 23/74; H04N 23/95; G06N 3/084
  See application file for complete search history.

(56) References Cited

U.S. PATENT DOCUMENTS

2019/0347520 A1\* 11/2019 Sato ........................ G06V 20/10
2020/0065942 A1\* 2/2020 Hiasa ........................ G06T 5/50
2021/0117664 A1\* 4/2021 Rizvi ...................... G06V 30/40

FOREIGN PATENT DOCUMENTS

| JP | 2014-052364 A | 3/2014 |
| JP | 2019-200769 A | 11/2019 |
| WO | 2019/054092 A1 | 3/2019 |

\* cited by examiner

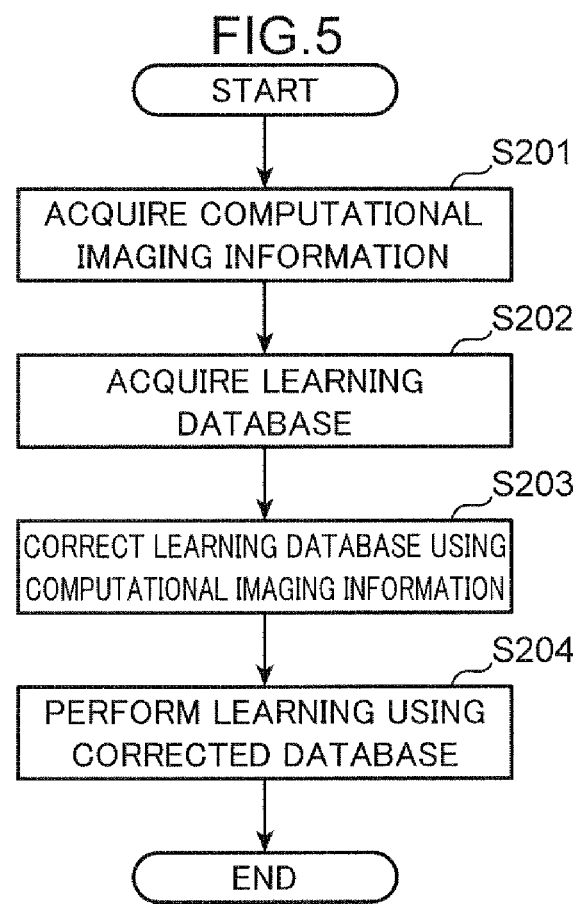

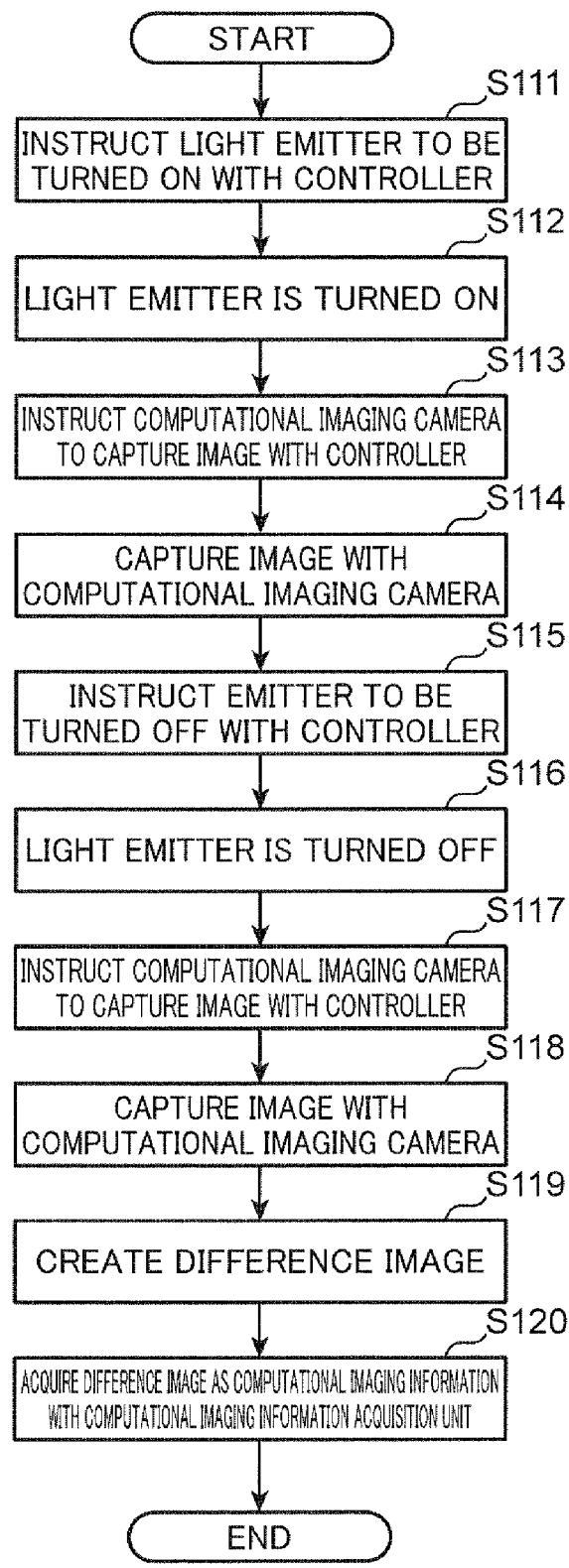

109

109

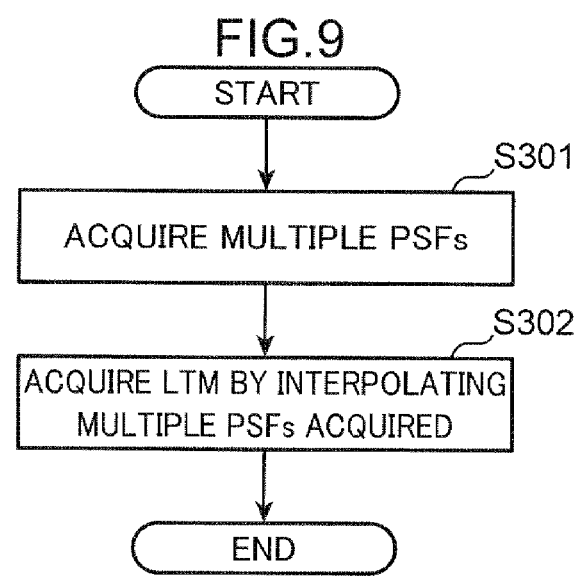

FIG.23A
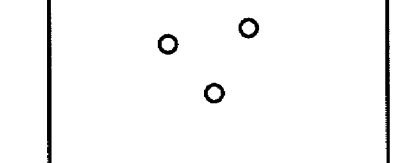
FIG.23B
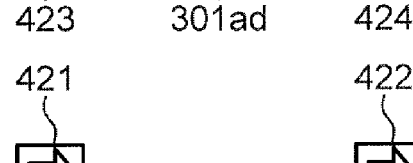
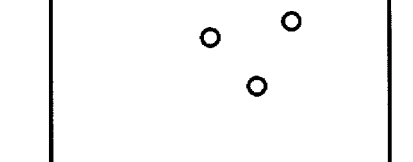
FIG.23C
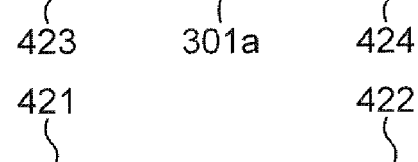
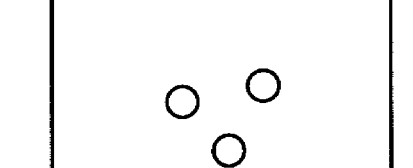
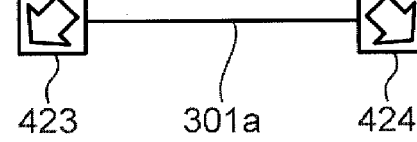

LEARNING METHOD, IMAGE IDENTIFICATION METHOD, LEARNING DEVICE, AND IMAGE IDENTIFICATION SYSTEM

TECHNICAL FIELD

The present disclosure relates to an image identification method and an image identification system in an environment requiring privacy protection, such as home or indoor, and a learning method and a learning device for creating an image identification model used for the image identification.

BACKGROUND ART

Patent Literature 1 below discloses an image identification system in which an identifier receives a computational image captured by a light-field camera or the like to identify an object included in the computational image using a learned identification model.

The computational image is difficult to be visually recognized by a person due to blurring that is intentionally created due to an influence such as superimposition of multiple images each having a different viewpoint, or a subject image that is less likely to be focused due to non-use of a lens. Thus, the computational image is preferably used to construct an image identification system in an environment requiring privacy protection, such as home or indoor.

Unfortunately, a computational image is difficult to be visually recognized by a person, so that it is difficult to assign an accurate correct answer label to the computational image captured by a light-field camera or the like, in machine learning for creating an identification model. As a result, learning efficiency deteriorates.

Patent Literature 1 below takes no measure against this problem, and thus is desired to be improved in learning efficiency by implementing effective technical measures.

CITATION LIST

Patent Literature

Patent Literature 1: WO 2019/054092 A

SUMMARY OF INVENTION

It is an object of the present disclosure to provide a technique capable of improving image identification accuracy and improving learning efficiency of machine learning while protecting privacy of a subject in an image identification system.

A learning method according to an aspect of the present disclosure includes, by an information processing device serving as a learning device: acquiring computational imaging information of a first camera that captures an image with blurring, the computational imaging information being a difference image between a first image and a second image that are captured by the first camera, the first image including a point light source in a lighting state and the second image including the point light source in a non-lighting state; acquiring a third image captured by a second camera that captures an image without blurring or an image with blurring smaller than that of the first camera, and a correct answer label assigned to the third image; generating a fourth image with blurring based on the computational imaging information and the third image; and performing machine learning using the fourth image and the correct answer label to create an image identification model for identifying an image captured by the first camera.

BRIEF DESCRIPTION OF DRAWINGS

FIG. 5 is a flowchart illustrating a procedure of main processing of a learning device.

FIG. 7 is a flowchart illustrating a procedure of main processing of an image identification system.

FIG. 9 is a flowchart illustrating a procedure of main processing of a computational imaging information acquisition unit when a light transport matrix (LTM) is used as computational imaging information.

FIG. 23A is a schematic diagram illustrating a configuration of a multi-pinhole camera according to a modification.

FIG. 23B is a schematic diagram illustrating a configuration of a multi-pinhole camera according to a modification.

FIG. 23C is a schematic diagram illustrating a configuration of a multi-pinhole camera according to a modification.

Figure 1:
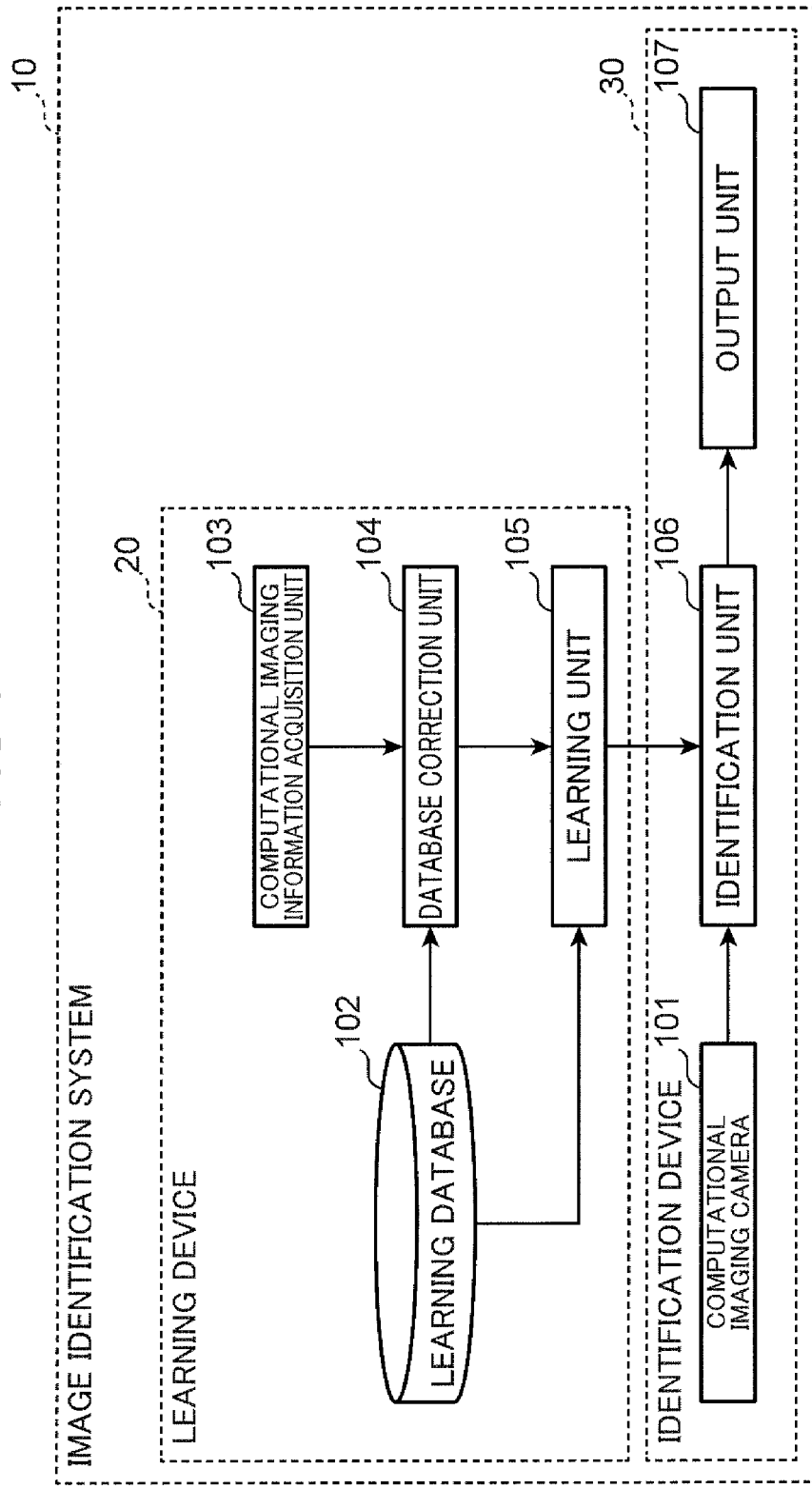
FIG. 1 is a schematic diagram illustrating a configuration of an image identification system according to a first embodiment.

DESCRIPTION OF EMBODIMENTS (Underlying Knowledge of Present Disclosure)

Various recognition techniques in home, indoor, or the like, such as behavior recognition of a person in environment and person recognition of a device operator, are important. In recent years, a technique called deep learning has attracted attention for object identification. The deep learning is machine learning using a neural network having a multilayer structure, and enables achieving more accurate identification performance as compared with a conventional method by using a large amount of learning data. In such object identification, image information is particularly effective. Various methods have been proposed for greatly improving conventional object identification capability by using a camera as an input device and performing deep learning using image information as an input.

Unfortunately, disposing a camera in home or the like causes a problem in that privacy is violated when a captured image leaks to the outside due to hacking or the like. Thus, a measure is required to protect privacy of a subject even when a captured image leaks to the outside.

Computational images captured by a light-field camera or the like are difficult to be visually recognized by a person due to blurring that is intentionally created due to an influence such as superimposition of multiple images each having a different viewpoint, or a subject image that is less likely to be focused due to non-use of a lens. Thus, the computational image is preferably used to construct an image identification system in an environment requiring privacy protection, such as home or indoor.

The image identification system disclosed in Patent Literature 1 is configured such that a target area is photographed by a light-field camera or the like, and a computational image acquired by the photographing is input to an identifier. This configuration allows the identifier to identify an object included in the computational image using a learned identification model. When the target area is photographed by a light-field camera or the like that captures a computational image as described above, privacy of a subject can be protected even when the photographed image leaks to the outside due to the computational image that is difficult to be visually recognized by a person.

The image identification system disclosed in Patent Literature 1 is configured such that the identification model used by the identifier is created by performing machine learning using a computational image captured by a light-field camera or the like as learning data. Unfortunately, a computational image is difficult to be visually recognized by a person, so that it is difficult to assign an accurate correct answer label to the computational image captured by a light-field camera or the like, in machine learning for creating an identification model. When an incorrect correct answer label is assigned to the computational image for learning, learning efficiency of the machine learning deteriorates.

To solve such a problem, the present inventors have devised performing machine learning that uses an image without blurring (hereinafter referred to as a "normal image") instead of an image with blurring (hereinafter referred to as a "blurred image") such as a computational image in a stage of accumulating learning data, and that uses a blurred image obtained by converting a normal image based on computational imaging information of a used camera in a subsequent learning stage. As a result, the present inventors have found that image identification accuracy and learning efficiency of machine learning can be improved while privacy of a subject is protected, and have conceived the present disclosure.

As another viewpoint of privacy protection, it is also important to reduce a psychological load on a user whose image is to be captured by an image recognition device. Capturing a blurred image enables appeal for protecting privacy of a subject. However, when computational imaging information is set in a region unrelated to the user, such as a factory of a manufacturer, a psychological load on the user may increase due to a suspicion that the manufacturer can restore a normal image from a blurred image. Alternatively, the present inventors have considered that this psychological load can be reduced when a user himself/herself, whose image is to be captured, can change the computational imaging information, and have conceived the present disclosure.

Next, each aspect of the present disclosure will be described.

A learning method according to an aspect of the present disclosure includes, by an information processing device serving as a learning device: acquiring computational imaging information of a first camera that captures an image with blurring, the computational imaging information being a difference image between a first image and a second image that are captured by the first camera, the first image including a point light source in a lighting state and the second image including the point light source in a non-lighting state; acquiring a third image captured by a second camera that captures an image without blurring or an image with blurring smaller than that of the first camera, and a correct answer label assigned to the third image; generating a fourth image with blurring based on the computational imaging information and the third image; and performing machine learning using the fourth image and the correct answer label to create an image identification model for identifying an image captured by the first camera.

In the present disclosure, the term "blurring" indicates a state in which visual recognition by a person is difficult due to an influence such as superimposition of multiple images each having a different viewpoint and being captured by a light-field camera, a lensless camera, or the like, or a subject image that is less likely to be focused due to non-use of a lens, or a state in which a subject is simply out of focus. The term "image with blurring" means an image that is difficult to be visually recognized by a person or an image in which a subject is out of focus. The term "large blur" means a large degree of difficulty in visual recognition by a person or a large degree of out-of-focus of a subject, and the term "small blur" means a small degree of the difficulty in visual recognition or a small degree of the out-of-focus. The term "image without blurring" means an image that is easily visually recognized by a person or an image in which a subject is focused.

This configuration allows a target area where a subject as an image identification target is located to be captured by the first camera that captures an image with blurring. Thus, even when an image captured by the first camera leaks to the outside, the image is difficult to be visually recognized by a person, so that privacy of the subject can be protected. The third image serving as learning data is captured by the second camera that captures an image without blurring or an image with blurring smaller than that of the first camera. Thus, the image is easily visually recognized by a person, so that an accurate correct answer label can be easily assigned to the third image. The computational imaging information of the first camera is a difference image between the first image including the point light source in a lighting state and the second image including the point light source in a non-lighting state. Thus, the computational imaging information of the first camera to be actually used can be accurately acquired without being affected by the subject other than the point light source. This configuration enables the fourth image, which is to be used for machine learning, to be accurately generated based on the computational imaging information and the third image. As a result, image identification accuracy and learning efficiency of machine learning can be improved while privacy of a subject is protected.

The above aspect may be configured such that the first camera is any one of a coded aperture camera including a mask having a mask pattern with a transmittance different for each region, a multi-pinhole camera including a mask having a mask pattern in which multiple pinholes are formed and an image sensor with a light receiving surface on which the mask is disposed, and a light-field camera that acquires a light field from a subject.

This configuration enables an image with blurring, which is difficult to be visually recognized by a person, to be appropriately captured by using any one of the coded aperture camera, the multi-pinhole camera, and the light-field camera as the first camera.

The above aspect may be configured such that the first camera includes no optical system that forms an image of light from a subject on an image sensor.

This configuration enables blurring to be intentionally created in an image captured by the first camera because the first camera includes no optical system that forms an image of light from a subject on an image sensor. As a result, the subject included in the captured image is further difficult to be identified, so that an effect of protecting the privacy of the subject can be further enhanced.

The above aspect may be configured such that the mask is changeable to another mask having a different mask pattern.

This configuration enables computational imaging information to be changed for each user by allowing a corresponding user to arbitrarily change the mask, for example, because the computational imaging information of the first camera also changes by changing the mask. As a result, it is difficult for a third party to inversely convert the fourth image into the third image, so that the effect of protecting the privacy of the subject can be further enhanced.

The above aspect may be configured such that the computational imaging information is any one of a point spread function and a light transport matrix.

This configuration enables the computational imaging information of the first camera to be easily and appropriately acquired by using any one of the PSF or the LTM.

The above aspect may be configured such that the information processing device performs lighting control of the point light source and imaging control of the first image captured by the first camera, and performs non-lighting control of the point light source and imaging control of the second image captured by the first camera.

This configuration enables timing of turning on or off the point light source and timing of imaging with the first camera to be accurately synchronized by allowing the information processing device to control operation of each of the point light source and the first camera.

The above aspect may be configured such that the information processing device performs re-imaging control of the first image and the second image captured by the first camera when the difference image has image quality less than an allowable value.

This configuration causes the information processing device to perform re-imaging control on the first camera when the difference image has the image quality less than the allowable value, and thus enables acquiring a difference image using the point light source in which a luminance value is appropriately adjusted. As a result, appropriate computational imaging information of the first camera can be acquired.

The above aspect may be configured such that the information processing device corrects at least one of exposure time and gain of the first camera in the re-imaging control to cause each of the first image and the second image to have a maximum luminance value within a predetermined range.

This configuration performs the re-imaging control to correct at least one of the exposure time and the gain of the first camera, and thus enables acquiring a difference image using the point light source in which a luminance value is appropriately adjusted.

An image identification method according to another aspect of the present disclosure includes, in an identification device including an identification unit: allowing the identification unit to receive an image captured by a first camera that captures an image with blurring; identifying, by the identification unit, the received image based on a learned image identification model; and outputting a result of the identification of the identification unit, wherein the image identification model is the image identification model created by the learning method according to the above aspect.

This configuration allows a target area where a subject as an image identification target is located to be captured by the first camera that captures an image with blurring. Thus, even when an image captured by the first camera leaks to the outside, the image is difficult to be visually recognized by a person, so that privacy of the subject can be protected. The third image serving as learning data is captured by the second camera that captures an image without blurring or an image with blurring smaller than that of the first camera. Thus, the image is easily visually recognized by a person, so that an accurate correct answer label can be easily assigned to the third image. The computational imaging information of the first camera is a difference image between the first image including the point light source in a lighting state and the second image including the point light source in a non-lighting state. Thus, the computational imaging information of the first camera to be actually used can be accurately acquired without being affected by the subject other than the point light source. This configuration enables the fourth image, which is to be used for machine learning, to be accurately generated based on the computational imaging information and the third image. As a result, image identification accuracy and learning efficiency of machine learning can be improved while privacy of a subject is protected.

A learning device according to yet another aspect of the present disclosure includes: an acquisition unit that acquires computational imaging information of a first camera that captures an image with blurring, the computational imaging information being a difference image between a first image and a second image that are captured by the first camera, the first image including a point light source in a lighting state and the second image including the point light source in a non-lighting state; a storage unit that stores a third image captured by a second camera that captures an image without blurring or an image with blurring smaller than that of the first camera, and a correct answer label assigned to the third image; an image generator that generates a fourth image with blurring based on the computational imaging information acquired by the acquisition unit and the third image read out from the storage unit; and a learning unit that performs machine learning using the fourth image generated by the image generator and the correct answer label read out from the storage unit to create an image identification model for identifying an image captured by the first camera.

This configuration allows a target area where a subject as an image identification target is located to be captured by the first camera that captures an image with blurring. Thus, even when an image captured by the first camera leaks to the outside, the image is difficult to be visually recognized by a person, so that privacy of the subject can be protected. The third image serving as learning data is captured by the second camera that captures an image without blurring or an image with blurring smaller than that of the first camera. Thus, the image is easily visually recognized by a person, so that an accurate correct answer label can be easily assigned to the third image. The computational imaging information of the first camera is a difference image between the first image including the point light source in a lighting state and the second image including the point light source in a non-lighting state. Thus, the computational imaging information of the first camera to be actually used can be accurately acquired without being affected by the subject other than the point light source. This configuration enables an image synthesizer to accurately generate the fourth image, which is to be used for machine learning, based on the computational imaging information and the third image. As a result, image identification accuracy and learning efficiency of machine learning can be improved while privacy of a subject is protected.

An image identification system according to yet another aspect of the present disclosure includes: an acquisition unit that acquires computational imaging information of a first camera that captures an image with blurring, the computational imaging information being a difference image between a first image and a second image that are captured by the first camera, the first image including a point light source in a lighting state and the second image including the point light source in a non-lighting state; a storage unit that stores a third image captured by a second camera that captures an image without blurring or an image with blurring smaller than that of the first camera, and a correct answer label assigned to the third image; an image generator that generates a fourth image with blurring based on the computational imaging information acquired by the acquisition unit and the third image read out from the storage unit; a learning unit that performs machine learning using the fourth image generated by the image generator and the correct answer label read out from the storage unit to create an image identification model; an identification unit that identifies an image captured by the first camera based on the image identification model created by the learning unit; and an output unit that outputs an identification result of the identification unit.

This configuration allows a target area where a subject as an image identification target is located to be captured by the first camera that captures an image with blurring. Thus, even when an image captured by the first camera leaks to the outside, the image is difficult to be visually recognized by a person, so that privacy of the subject can be protected. The third image serving as learning data is captured by the second camera that captures an image without blurring or an image with blurring smaller than that of the first camera. Thus, the image is easily visually recognized by a person, so that an accurate correct answer label can be easily assigned to the third image. The computational imaging information of the first camera is a difference image between the first image including the point light source in a lighting state and the second image including the point light source in a non-lighting state. Thus, the computational imaging information of the first camera to be actually used can be accurately acquired without being affected by the subject other than the point light source. This configuration enables an image synthesizer to accurately generate the fourth image, which is to be used for machine learning, based on the computational imaging information and the third image. As a result, image identification accuracy and learning efficiency of machine learning can be improved while privacy of a subject is protected.

The present disclosure can also be implemented as a computer program for causing a computer to execute each characteristic configuration included in a method as described above, or can also be implemented as a device or a system that operates based on the computer program. It is needless to say that such a computer program can be distributed as a computer-readable non-volatile recording medium such as a CD-ROM, or can be distributed via a communication network such as the Internet.

Each of the embodiments described below illustrates a specific example of the present disclosure. Numerical values, shapes, components, steps, order of steps, and the like shown in the following embodiments are merely examples, and are not intended to limit the present disclosure. The components in the embodiments below include a component that is not described in an independent claim representing the highest concept and that is described as an arbitrary component. All the embodiments have respective contents that can be combined.

Hereinafter, the embodiments of the present disclosure will be described in detail with reference to the drawings. Elements denoted by the same corresponding reference numerals in different drawings represent the same or corresponding elements.

First Embodiment

FIG. 1 is a schematic diagram illustrating a configuration of an image identification system 10 according to a first embodiment of the present disclosure. The image identification system 10 includes a learning device 20 and an identification device 30. The identification device 30 includes a computational imaging camera 101, an identification unit 106, and an output unit 107. The identification unit 106 includes a processor such as a CPU, and a memory such as a semiconductor memory. The output unit 107 is a display device, a speaker, or the like. The learning device 20 includes a learning database 102, a computational imaging information acquisition unit 103, a database correction unit 104, and a learning unit 105. The learning database 102 is a storage unit such as an HDD, an SSD, or a semiconductor memory. The computational imaging information acquisition unit 103, the database correction unit 104, and the learning unit 105 are each a processor such as a CPU.

Figure 2:
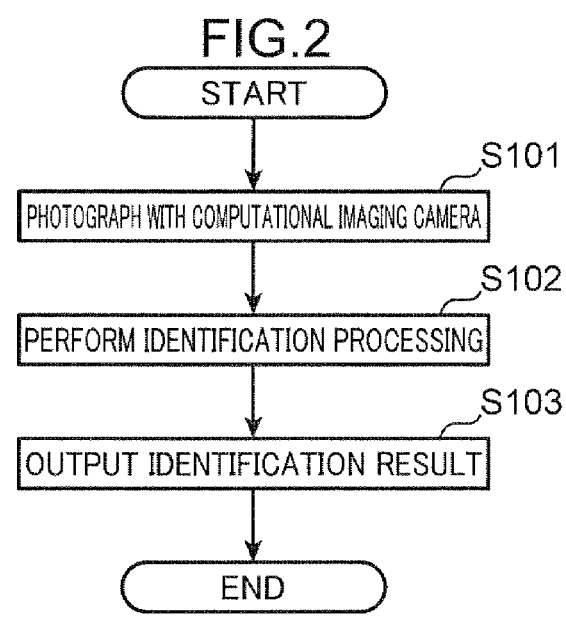
FIG. 2 is a flowchart illustrating a procedure of main processing of an image identification system.

FIG. 2 is a flowchart illustrating a procedure of main processing of the image identification system 10. The flowchart illustrates a flow of image identification processing of the identification device 30. The computational imaging camera 101 first photographs a target area, and inputs a computational image obtained by the photographing into the identification unit 106 (step S101). The identification unit 106 subsequently identifies the computational image using the learned image identification model (step S102). This image identification model is the image identification model created by learning of the learning device 20. Next, the output unit 107 outputs a result of identification of the identification unit 106. Details of the processing in each step will be described later.

Unlike a normal camera that captures a normal image without blurring, the computational imaging camera 101 captures a computational image serving as an image with blurring. Although a subject in the computational image cannot be recognized by a person who views the computational image itself due to intentionally created blurring, an image can be generated from the computational image by performing image processing on the captured computational image, the image being able to be recognized by the person or identified by the identification unit 106.

Figure 3:
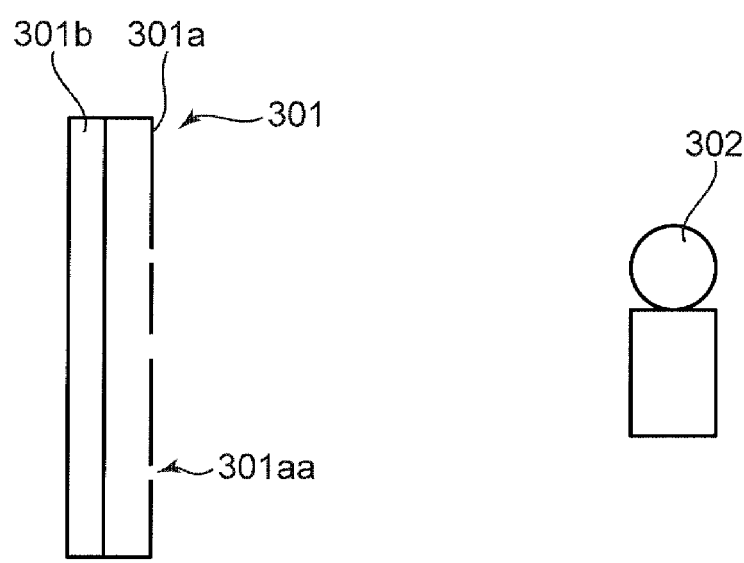
FIG. 3 is a diagram schematically illustrating structure of a lenseless multi-pinhole camera as an example of a computational imaging camera.

FIG. 3 is a diagram schematically illustrating structure of a lenseless multi-pinhole camera 301 as an example of the computational imaging camera 101. The multi-pinhole camera 301 illustrated in FIG. 3 includes a multi-pinhole mask 301a, and an image sensor 301b such as a CMOS. The multi-pinhole mask 301a is disposed at a predetermined interval from a light receiving surface of the image sensor 301b. The multi-pinhole mask 301a has multiple pinholes 301aa disposed at random or equal intervals. The multiple pinholes 301aa are also referred to as multi-pinholes. The image sensor 301b acquires an image of a subject 302 through each pinhole 301aa. The image acquired through a pinhole is referred to as a pinhole image.

The pinhole image of the subject 302 differs depending on a position and a size of each pinhole 301aa, so that the image sensor 301b acquires a superimposed image (multiple image) in a state in which multiple pinhole images are superimposed while being slightly shifted. The multiple pinholes 301aa has a positional relationship that affects a positional relationship among the multiple pinhole images projected on image sensor 301b (i.e., a degree of superimposition of multiple images), and a size of each pinhole 301aa affects a degree of blurring of a pinhole image.

Using the multi-pinhole mask 301a enables acquiring multiple pinhole images each having a different position and a different degree of blurring while superimposing the images. That is, a computational image in which multiple images and blurring are intentionally created can be acquired. Thus, a photographed image is a multiple image and a blurred image, and an image in which privacy of the subject 302 is protected by the blurring can be acquired. When the pinholes are changed in number, position, and size, images each having a different blurring pattern can be acquired. That is, the multi-pinhole mask 301a may be configured to be able to be easily attached and detached by a user, and multiple types of multi-pinhole mask 301a, each having a different mask pattern, may be prepared in advance to allow the user to freely replace the multi-pinhole mask 301a to be used.

Changing a mask as described above can be implemented by various methods in addition to the replacement of the mask, such as:

a user arbitrarily rotating the mask rotatably attached in front of an image sensor;

the user making a hole in an arbitrary place of the plate attached in front of the image sensor;

using a liquid crystal mask or the like using a spatial light modulator or the like to arbitrarily set transmittance at each position in the mask; and molding a mask using a stretchable material such as rubber to change a position and a size of a hole by physically deforming the mask by application of an external force.

Hereinafter, these modifications will be described in order.
<Modification in which User Arbitrarily Rotates Mask>

Figure 17A:
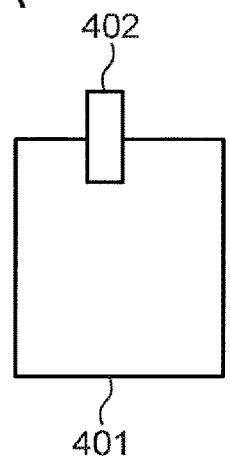
FIG. 17A is a schematic diagram illustrating a configuration of a multi-pinhole camera according to a modification.
Figure 17B:
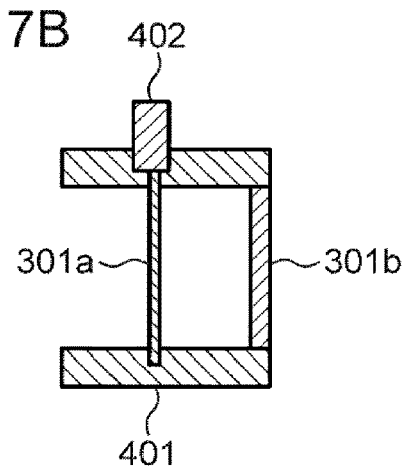
FIG. 17B is a schematic diagram illustrating a configuration of a multi-pinhole camera according to a modification.
Figure 17C:
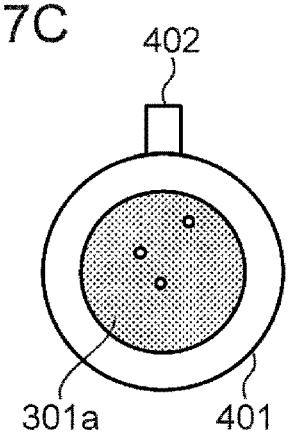
FIG. 17C is a schematic diagram illustrating a configuration of a multi-pinhole camera according to a modification.
Figure 17D:
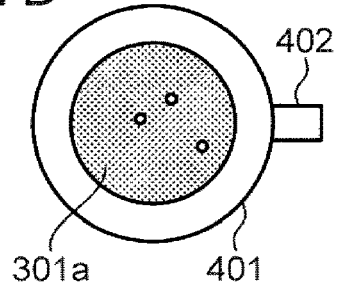
FIG. 17D is a schematic diagram illustrating a configuration of a multi-pinhole camera according to a modification.

FIGS. 17A to 17D are each a schematic diagram illustrating a configuration of the multi-pinhole camera 301 in which a user can arbitrarily rotate a mask. FIG. 17A illustrates an overview of the multi-pinhole camera 301 in which a user can arbitrarily rotate a mask, and FIG. 17B is a schematic diagram illustrating a section of the multi-pinhole camera 301. The multi-pinhole camera 301 includes the multi-pinhole mask 301a rotatable with respect to a housing 401, and a gripper 402 connected to the multi-pinhole mask 301a. The user can fix or rotate the multi-pinhole mask 301a with respect to the housing 401 by gripping and operating the gripper 402. This kind of mechanism may be configured as follows: a screw is provided in the gripper 402; the screw is tightened to fix the multi-pinhole mask 301a; and the screw is loosened to allow the multi-pinhole mask 301a to be rotatable. FIGS. 17C and 17D are schematic diagrams illustrating the multi-pinhole mask 301a that rotates by 90 degrees when the gripper 402 is rotated by 90 degrees. As described above, the multi-pinhole mask 301a can be rotated when the user moves the gripper 402.

The multi-pinhole camera 301, in which the user can arbitrarily rotate the mask, may be configured such that the multi-pinhole mask 301a includes pinholes disposed asymmetrically with respect to a rotation axis as illustrated in FIG. 17C. This configuration enables various multi-pinhole patterns to be implemented when the user rotates the mask.

Figure 18A:
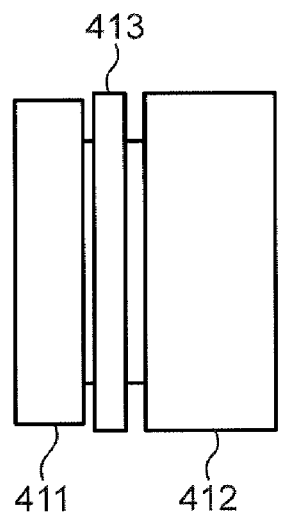
FIG. 18A is a schematic diagram illustrating a configuration of a multi-pinhole camera according to a modification.
Figure 18B:
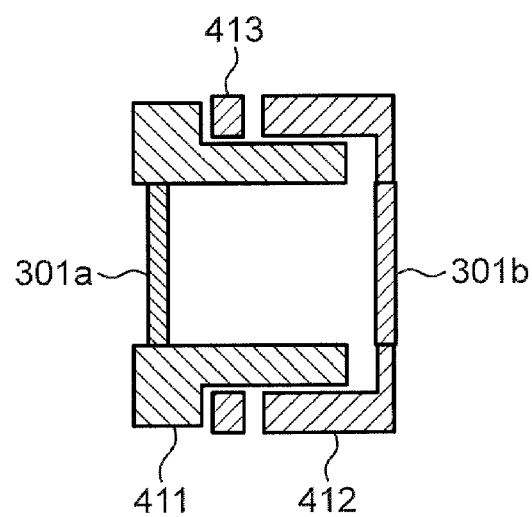
FIG. 18B is a schematic diagram illustrating a configuration of a multi-pinhole camera according to a modification.

As a matter of course, the multi-pinhole camera 301, in which the user can arbitrarily rotate the mask, may be configured without the gripper 402. FIGS. 18A and 18B are each a schematic diagram illustrating another configuration example of the multi-pinhole camera 301 in which a user can arbitrarily rotate a mask. FIG. 18A illustrates an overview of the other example of the multi-pinhole camera 301 in which a user can arbitrarily rotate a mask, and FIG. 18B is a schematic diagram illustrating a section of the other example. The multi-pinhole mask 301a is fixed to a lens barrel 411. Then, the image sensor 301b is installed in another lens barrel 412, and the lens barrel 411 and the lens barrel 412 are rotatable with a screw configuration. That is, the lens barrel 412 is provided outside the lens barrel 411, and a male thread is cut outside the lens barrel 411 serving as a joint part, and a female thread is cut inside the lens barrel 412. The lens barrel 411 includes the male thread to which a fixture 413 is first attached, and then the lens barrel 412 is attached. As with the lens barrel 412, a female thread is cut also in the fixture 413. This configuration described above enables a rotation angle of the multi-pinhole camera 301 to be changed due to change in screwing depth caused by a screwing position of the fixture 413 into the lens barrel 411 when the lens barrel 411 is screwed into the lens barrel 412.

Figure 18C:
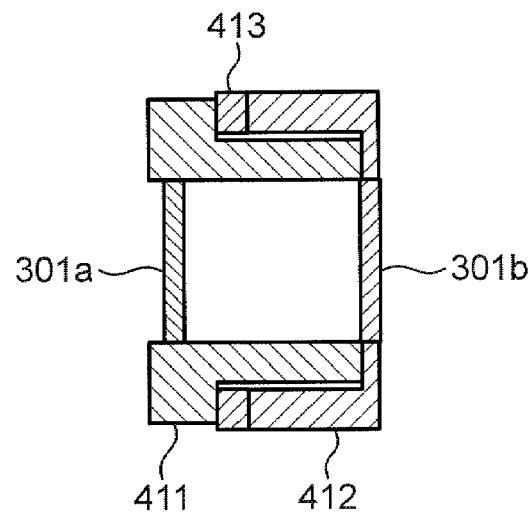
FIG. 18C is a schematic diagram illustrating a configuration of a multi-pinhole camera according to a modification.
Figure 18D:
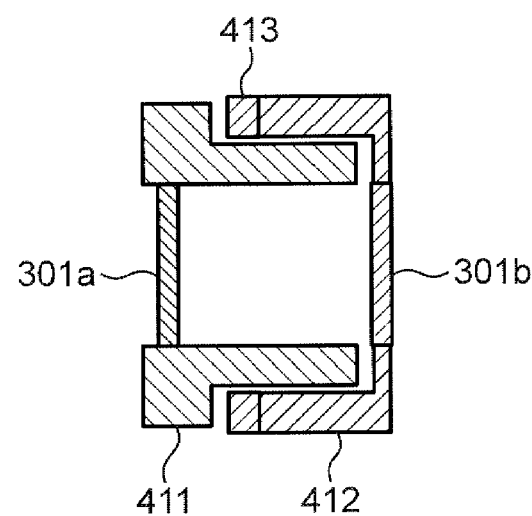
FIG. 18D is a schematic diagram illustrating a configuration of a multi-pinhole camera according to a modification.

FIGS. 18C and 18D are schematic diagrams illustrating that the screwing depth changes and the rotation angle of the multi-pinhole camera 301 changes in accordance with a screwing position of the fixture 413 into the lens barrel 411. FIG. 18C is a schematic diagram when the fixture 413 is screwed onto the lens barrel 411 all the way, and FIG. 18D is a schematic diagram when the fixture 413 is screwed onto the lens barrel 411 only midway. As illustrated in FIG. 18C, when the fixture 413 is screwed onto the lens barrel 411 all the way, the lens barrel 412 can be screwed onto the lens barrel 411 all the way. In contrast, when the fixture 413 is screwed onto the lens barrel 411 only midway, the lens barrel 412 can be screwed onto the lens barrel 411 only midway, as illustrated in FIG. 18D. Thus, the screwing depth changes in accordance with the screwing position of the fixture 413 onto the lens barrel 411, and then the rotation angle of the multi-pinhole mask 301a can be changed.

<Modification in which User Makes Hole in Mask>

Figure 19:
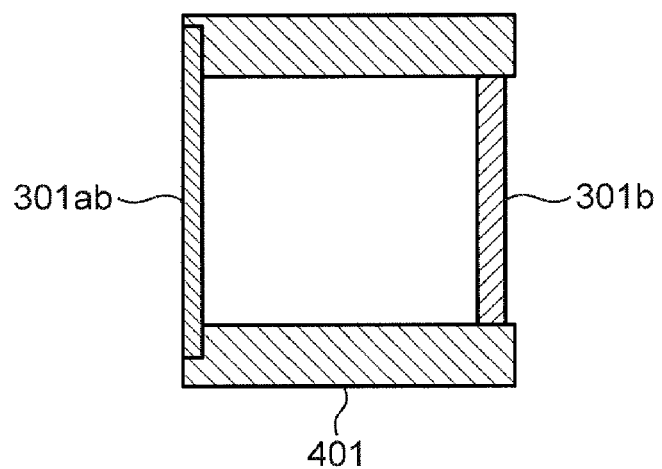
FIG. 19 is a schematic diagram illustrating a configuration of a multi-pinhole camera according to a modification.

FIG. 19 is a schematic diagram of a section of the multi-pinhole camera 301 in which a user can make a hole in an arbitrary place of a mask 301ab attached in front of the image sensor 301b. FIG. 19 illustrates the same components as those in FIG. 17 that are denoted by the same corresponding reference numerals as those in FIG. 17, and that are not described. The mask 301ab initially has no pinhole. When a user makes multiple holes in the mask 301ab at arbitrary positions using a needle or the like, a multi-pinhole mask in an arbitrary shape can be created.

<Modification in which Transmittance of Each Position in Mask is Arbitrarily Set Using Spatial Light Modulator>

Figure 20:
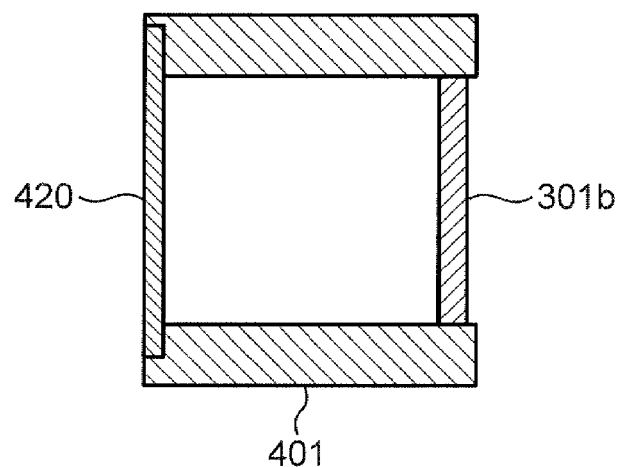
FIG. 20 is a schematic diagram illustrating a configuration of a multi-pinhole camera according to a modification.

FIG. 20 is a schematic diagram of a section of the multi-pinhole camera 301 configured to arbitrarily set transmittance at each position in a mask using a spatial light modulator 420. FIG. 20 illustrates the same components as those in FIG. 19 that are denoted by the same corresponding reference numerals as those in FIG. 19, and that are not described. The spatial light modulator 420 is composed of a liquid crystal or the like, and can change the transmittance for each pixel. The spatial light modulator 420 functions as a multi-pinhole mask. Change of the transmittance can be controlled by a spatial light modulator controller (not illustrated). Thus, when the user selects an arbitrary pattern from multiple transmittance patterns prepared in advance, various mask patterns (multi-pinhole patterns) can be implemented.

<Modification in which Mask is Deformed by Application of External Force>

Figure 21:
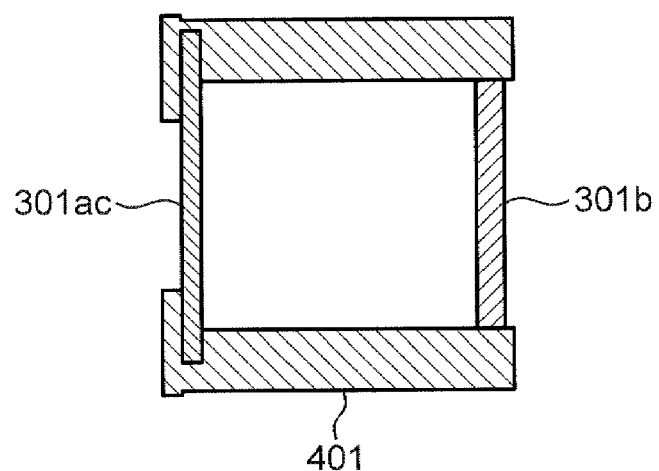
FIG. 21 is a schematic diagram illustrating a configuration of a multi-pinhole camera according to a modification.
Figure 22A:
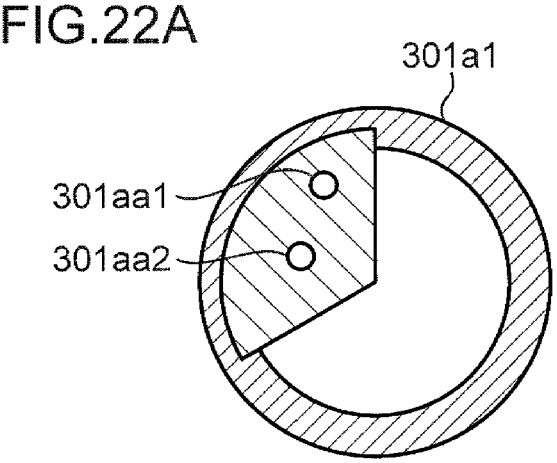
FIG. 22A is a schematic diagram illustrating a configuration of a multi-pinhole camera according to a modification.
Figure 22B:
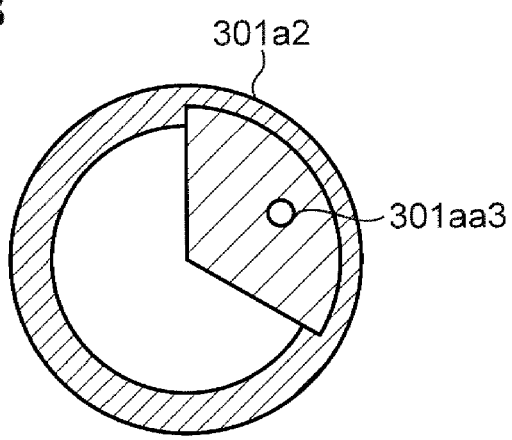
FIG. 22B is a schematic diagram illustrating a configuration of a multi-pinhole camera according to a modification.
Figure 22C:
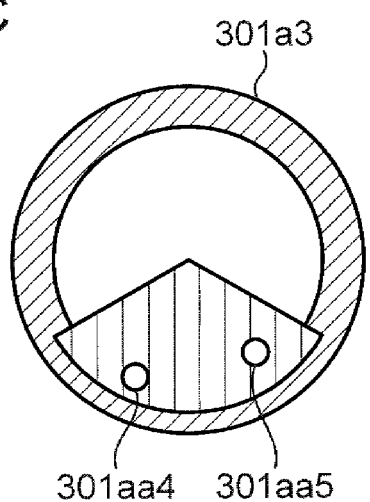
FIG. 22C is a schematic diagram illustrating a configuration of a multi-pinhole camera according to a modification.

FIGS. 21 and 22A to 22F are each a schematic diagram of a section of the multi-pinhole camera 301 configured to deform a mask by application of an external force. FIG. 21 illustrates the same components as those in FIG. 19 that are denoted by the same corresponding reference numerals as those in FIG. 19, and that are not described. A multi-pinhole mask 301ac includes multiple masks 301a1, 301a2, and 301a3, and each mask has a drive unit (not illustrated) that independently applies an external force. FIGS. 22A to 22C are respectively schematic diagrams for illustrating the three masks 301a1, 301a2, and 301a3 constituting the multi-pinhole mask 301ac. Here, each mask has a shape in which a fan shape and a circular ring are combined. As a matter of course, this configuration is an example, the shape is not limited to the fan shape, and the number of components is not limited to three. Each mask is provided with one or more pinholes. The mask may be provided with no pinhole. The mask 301a1 is provided with two pinholes 301aa1 and 301aa2, the mask 301a2 is provided with one pinhole 301aa3, and the mask 301a3 is provided with two pinholes 301aa4 and 301aa5. When these three masks 301a1 to 301a3 are moved by application of an external force, various multi-pinhole patterns can be created.

Figure 22D:
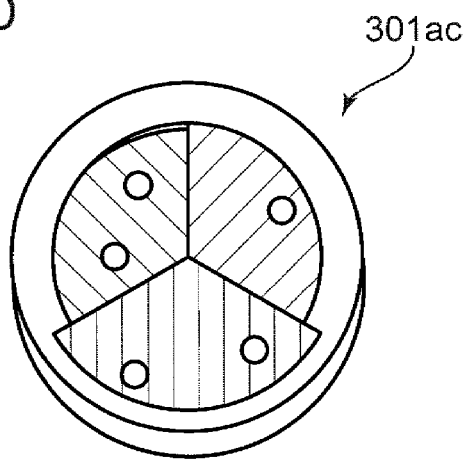
FIG. 22D is a schematic diagram illustrating a configuration of a multi-pinhole camera according to a modification.
Figure 22E:
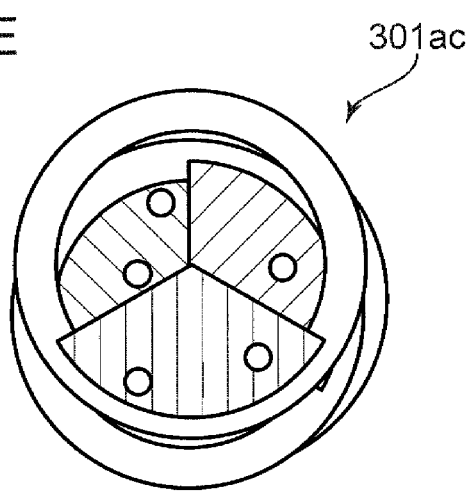
FIG. 22E is a schematic diagram illustrating a configuration of a multi-pinhole camera according to a modification.
Figure 22F:
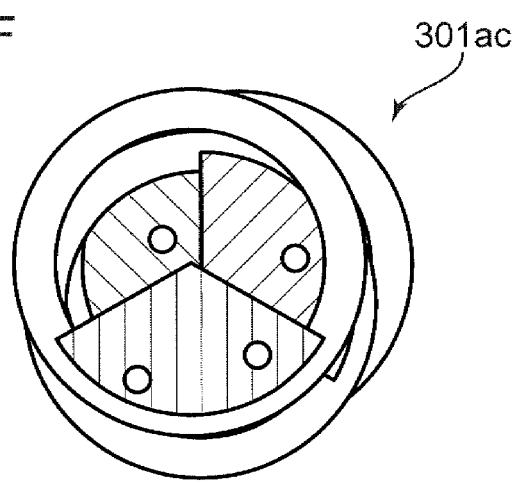
FIG. 22F is a schematic diagram illustrating a configuration of a multi-pinhole camera according to a modification.

FIGS. 22D to 22F illustrate respective three types of multi-pinhole mask 301ac composed of the three masks 301a1 to 301a3. When each of the masks 301a1 to 301a3 is moved in a different mode by corresponding one of drive units (not illustrated), a mask having five pinholes is faulted in each of FIGS. 22D and 22E, and a mask having four pinholes is formed in FIG. 22F. This kind of drive unit for a mask can be fabricated by using an ultrasonic motor or a linear motor widely used in autofocus or the like. As described above, the multi-pinhole mask 301ac can be changed in number and position of pinholes by application of an external force.

As a matter of course, the multi-pinhole mask may be changed not only in number and position of pinholes but also in size thereof. FIGS. 23A to 23C are each a schematic diagram for illustrating a configuration of a multi-pinhole mask 301ad in the multi-pinhole camera 301 configured to deform a mask using application of an external force. The multi-pinhole mask 301ad is made of an elastic material and includes multiple pinholes, and four drive units 421 to 424 capable of independently controlling respective four corners. As a matter of course, the number of drive units does not need to be four. When each of the drive units 421 to 424 is driven, the pinholes in the multi-pinhole mask 301ad can be each changed in position and size.

FIG. 23B is a schematic diagram illustrating a state where the drive units 421 to 424 are driven in the same direction. FIG. 23B illustrates arrows in the respective drive units 421 to 424, the arrows indicating driven directions of the respective drive units. In this case, the multi-pinhole mask 301ad is displaced parallel in the driving direction of the drive units. Then, FIG. 23C is a schematic diagram illustrating a state in which the drive units 421 to 424 are each driven outward from a central part of the multi-pinhole mask 301*ad*. In this case, the multi-pinhole mask 301*ad* is stretched in accordance with elasticity, so that the pinholes are each increased in size. The drive units 421 to 424 described above can be fabricated by using an ultrasonic motor or a linear motor widely used in autofocus or the like. As described above, the multi-pinhole mask 301*ac* can be changed in position and size of pinholes by application of an external force.

Figure 4A:
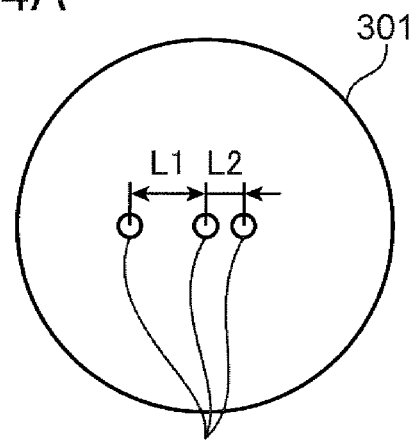
FIG. 4A is a diagram illustrating a positional relationship among multiple pinholes in a multi-pinhole camera.

FIG. 4A is a diagram illustrating a positional relationship among multiple pinholes 301*aa* in the multi-pinhole camera 301. This example shows three pinholes 301*aa* provided linearly. An interval between a leftmost pinhole 301*aa* and a center pinhole 301*aa* is set to L1, and an interval between the center pinhole 301*aa* and a rightmost pinhole 301*aa* is set to L2 (<L1).

Figure 4B:
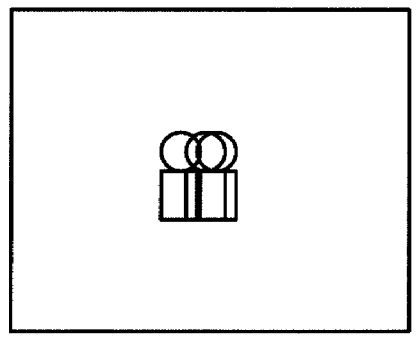
FIG. 4B is a diagram illustrating an example of an image captured by a multi-pinhole camera.
Figure 4C:
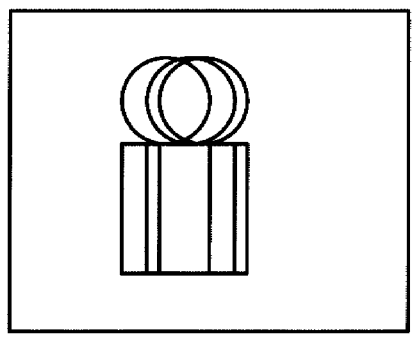
FIG. 4C is a diagram illustrating an example of an image captured by a multi-pinhole camera.

FIGS. 4B and 4C are each a diagram illustrating an example of an image captured by the multi-pinhole camera 301. FIG. 4B illustrates an example of a captured image with a small subject image due to a relatively long distance between the multi-pinhole camera 301 and the subject 302. FIG. 4C illustrates an example of a captured image with a large subject image due to a relatively short distance between the multi-pinhole camera 301 and the subject 302. When the intervals L1 and L2 are made different from each other, multiple images having different viewpoints are superimposed regardless of the distance between the multi-pinhole camera 301 and the subject 302, thereby capturing a superimposed image with multiple subject images that are superimposed in an individually unrecognizable manner.

Examples of a well-known camera other than the multi-pinhole camera 301, which are available for the computational imaging camera 101, include:

- a coded aperture camera with a mask having a mask pattern with a transmittance different for each region, the mask being disposed between an image sensor and a subject;
- a light-field camera having a configuration in which a microlens array is disposed on a light receiving surface of an image sensor to acquire a light field; and
- a compression sensing camera that captures an image by weighting and adding pixel information of time and space.

The computational imaging camera 101 desirably does not include an optical system, such as a lens, a prism, and a mirror, for forming an image of light from a subject on an image sensor. Eliminating the optical system enables reducing the camera in size, weight, and cost, and improving a design, and also intentionally creating blurring in an image captured by the camera.

The identification unit 106 uses the image identification model that is a learning result of the learning device 20 to identify category information on subjects such as a person (including a behavior and an expression), an automobile, a bicycle, and a traffic light, and positional information on each of the subjects, which are included in an image of a target area captured by the computational imaging camera 101. Machine learning such as deep learning using a multilayer neural network may be used for learning for creating the image identification model.

The output unit 107 outputs an identification result of the identification unit 106. The output unit 107 may include an interface unit to present the identification result to the user by an image, text, voice, or the like, or may include an apparatus controller to change a control method depending on the identification result.

The learning device 20 includes the learning database 102, the computational imaging information acquisition unit 103, the database correction unit 104, and the learning unit 105. The learning device 20 performs learning for creating the image identification model to be used by the identification unit 106 in association with the computational imaging information of the computational imaging camera 101 that is to be actually used for capturing an image of the target area.

FIG. 5 is a flowchart illustrating a procedure of main processing of the learning device 20 of the image identification system 10.

The computational imaging information acquisition unit 103 first acquires computational imaging information that indicates a mode of burring expressing what type of blurred image is captured by the computational imaging camera 101 (step S201). In step S201, the computational imaging camera 101 may include a transmitter, and the computational imaging information acquisition unit 103 may include a receiver, thereby exchanging the computational imaging information of a wired or wireless manner. Alternatively, the computational imaging information acquisition unit 103 may include an interface, and the user may input the computational imaging information to the computational imaging information acquisition unit 103 via the interface.

For example, when the computational imaging camera 101 is the multi-pinhole camera 301, a point spread function (PSF) indicating a state of two-dimensional computational imaging may be used as the computational imaging information. The PSF is a transfer function of a camera such as a multi-pinhole camera or a coded aperture camera, and is expressed by the following relationship.

$$y = k * x$$

Here, y is a computational image with blurring captured by the multi-pinhole camera 301, k is a PSF, and x is a normal image without blurring of a scene captured by a normal camera. Then, * is a convolution operator.

Alternatively, a light transport matrix (LTM) indicating computational imaging information including four or more dimensions (two or more dimensions on a camera side and two or more dimensions on a subject side) may be used as the computational imaging information instead of the PSF. The LTM is a transfer function used in a light-field camera.

For example, when the computational imaging camera 101 is the multi-pinhole camera 301, the PSF can be acquired by photographing a point light source with the multi-pinhole camera 301. This can be seen from the fact that the PSF corresponds to an impulse response of the camera. That is, a captured image itself of the point light source obtained by capturing an image of the point light source with the multi-pinhole camera 301 is the PSF as the computational imaging information of the multi-pinhole camera 301. Here, a difference image between a lighting state and a non-lighting state is desirably used as the captured image of the point light source, and this will be described in a second embodiment described later.

Next, the database correction unit 104 acquires a normal image without blurring included in the learning database 102, and the learning unit 105 acquires annotation information included in the learning database 102 (step S202).

Subsequently, the database correction unit 104 (image generator) corrects the learning database 102 using the computational imaging information acquired by the computational imaging information acquisition unit 103 (step S203). For example, when the identification unit 106 identifies a behavior of a person in an environment, the learning database 102 holds multiple normal images without blurring photographed by a normal camera, and annotation information (correct answer label) that is assigned to each image and that indicates a position at which the person has performed what kind of behavior in the image. When a normal camera is used, annotation information may be assigned to an image captured by the camera. However, when a computational image is acquired by a multi-pinhole camera or a light-field camera, it is difficult to assign annotation information to the image because a person cannot find what the image shows even when looking at the image. Additionally, even when learning processing is perforated on an image captured by a normal camera significantly different from the computational imaging camera 101, the identification unit 106 does not increase in identification accuracy. Thus, the identification accuracy is improved as follows: a database in which annotation information is preliminarily assigned to an image captured by a normal camera is held as the learning database 102; only the captured image is deformed in accordance with the computational imaging information of the computational imaging camera 101 to create learning data set corresponding to the computational imaging camera 101; and the learning processing is performed. For this processing, the database correction unit 104 calculates a corrected image y below using the PSF, which is the computational imaging information acquired by the computational imaging information acquisition unit 103, for an image z that is photographed by the normal camera and that is prepared in advance.

$$y = k * z$$

Here, k represents the PSF that is the computational imaging information acquired by the computational imaging information acquisition unit 103, and * represents a convolution operator.

The learning unit 105 performs the learning processing using the corrected image calculated by the database correction unit 104 and the annotation information acquired from the learning database 102 (step S204). For example, when the identification unit 106 is constructed by a multi-layer neural network, machine learning by deep learning is performed using the corrected image and the annotation information as teacher data. As a prediction error correction algorithm, a back propagation method or the like may be used. As a result, the learning unit 105 creates an image identification model for the identification unit 106 to identify an image captured by the computational imaging camera 101. The corrected image matches the computational imaging information of the computational imaging camera 101, so that the learning described above enables learning suitable for the computational imaging camera 101 to allow the identification unit 106 to perform identification processing with high accuracy.

The image identification system 10 according to the present embodiment allows an image of a target area, where the subject 302 as an image identification target is located, to be captured by the computational imaging camera 101 (first camera) that captures a computational image that is a blurred image. Thus, even when an image captured by the computational imaging camera 101 leaks to the outside, the computational image is difficult to be visually recognized by a person, so that privacy of the subject 302 can be protected. Then, a normal image (third image) to be accumulated in the learning database 102 is captured by a normal camera (second camera) that captures an image without blurring (or an image with blurring smaller than that of a computational image). Thus, the image is easily visually recognized by a person, so that accurate annotation information (correct answer label) can be easily assigned to the normal image. As a result, image identification accuracy and learning efficiency of machine learning can be improved while privacy of the subject 302 is protected.

Using any one of the coded aperture camera, the multi-pinhole camera, and the light-field camera as the computational imaging camera 101 enables an image with blurring, which is difficult to be visually recognized by a person, to be appropriately captured.

Eliminating an optical system that forms an image of light from the subject 302 on the image sensor 301b in the computational imaging camera 101 enables blurring to be intentionally created in an image captured by the computational imaging camera 101. As a result, the subject 302 included in the captured image is further difficult to be identified, so that an effect of protecting the privacy of the subject 302 can be further enhanced.

When the multi-pinhole mask 301a to be used is configured to be freely changeable by a user, changing the mask causes the computational imaging information of the computational imaging camera 101 to be also changed. Thus, when each of users arbitrarily changes the mask, for example, the computational imaging information can be made different for each of the users. As a result, it is difficult for a third party to inversely convert the corrected image (fourth image) into the formal image (third image), so that the effect of protecting the privacy of the subject 302 can be further enhanced.

Using any one of the PSF and the LTM as the computational imaging information enables the computational imaging information of the computational imaging camera 101 to be easily and appropriately acquired.

Second Embodiment

Figure 6:
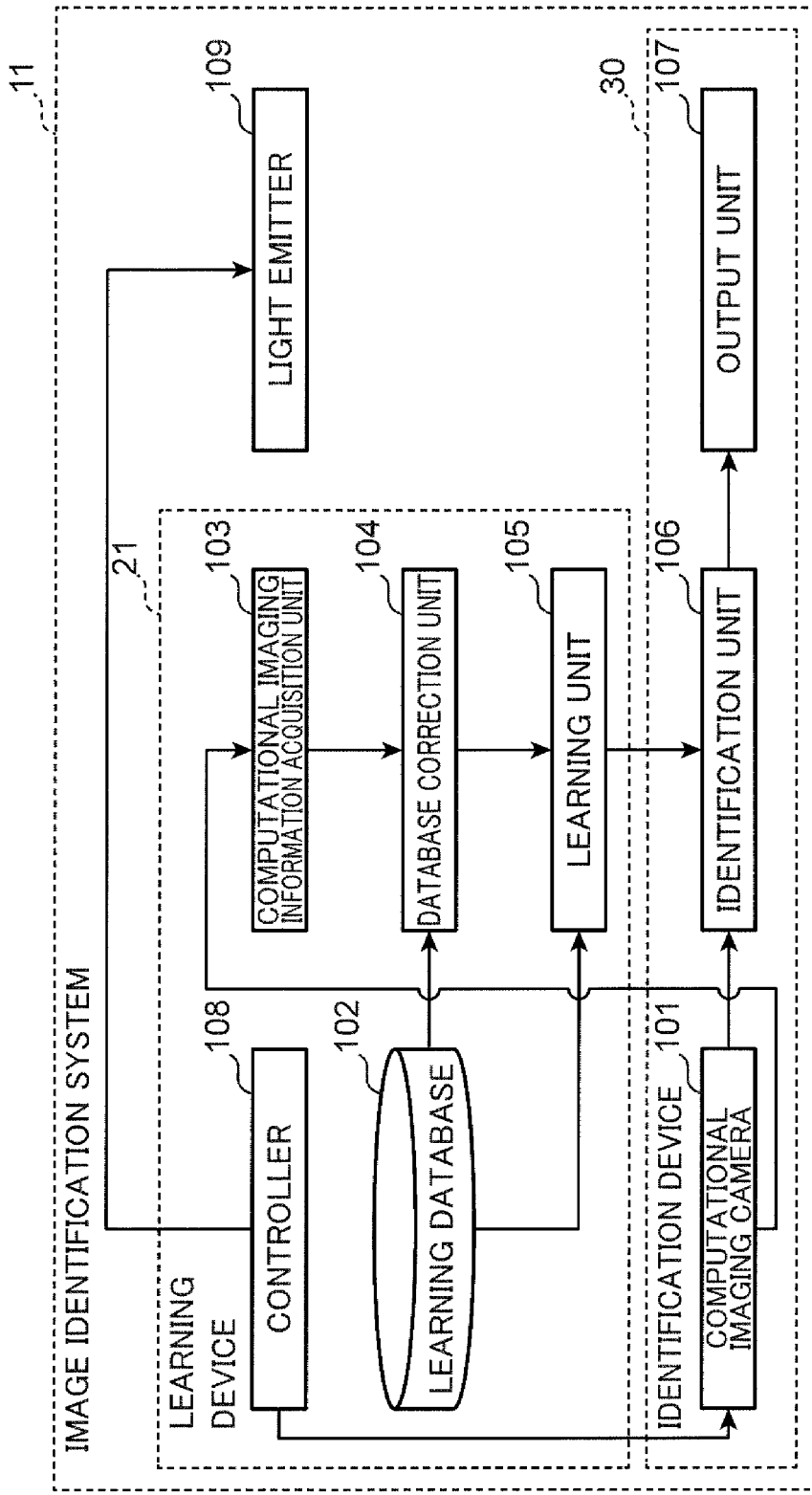
FIG. 6 is a schematic diagram illustrating a configuration of an image identification system according to a second embodiment.

FIG. 6 is a schematic diagram illustrating a configuration of an image identification system 11 according to a second embodiment of the present disclosure. FIG. 6 illustrates the same components as those in FIG. 1 that are denoted by the same corresponding reference numerals as those in FIG. 1, and that are not described. The image identification system 11 includes a learning device 21 including a controller 108. The image identification system 11 also includes a light emitter 109 existing in a target area (environment) that is to be photographed by a computational imaging camera 101. The light emitter 109 is a light source that can be regarded as a point light source existing in the environment, and is an LED mounted on an electric apparatus or an LED for illumination, for example. Additionally, only a part of light of a monitor such as an LED monitor may be turned on and off to function as the light emitter 109. The controller 108 controls the light emitter 109 and the computational imaging camera 101 to allow a computational imaging information acquisition unit 103 to acquire computational imaging information.

FIG. 7 is a flowchart illustrating a procedure of main processing of the image identification system 11. The flowchart illustrates a flow of processing in which the computational imaging information acquisition unit 103 acquires computational imaging information of the computational imaging camera 101.

The controller 108 first issues a lighting instruction to the light emitter 109 existing in the environment (step S111).

Next, the light emitter 109 turns on lighting according to the instruction from the controller 108 (step S112).

Subsequently, the controller 108 instructs the computational imaging camera 101 to capture an image (step S113).

This processing enables the light emitter 109 and the computational imaging camera 101 to operate in synchronism with each other.

Next, the computational imaging camera 101 captures an image according to the instruction of the controller 108 (step S114). The captured image (first image) is input from the computational imaging camera 101 into the computational imaging information acquisition unit 103, and is temporarily held by the computational imaging information acquisition unit 103.

Subsequently, the controller 108 issues a turn-off instruction to the light emitter 109 (step S115).

Next, the light emitter 109 turns off the lighting according to the instruction from the controller 108 (step S116).

Subsequently, the controller 108 instructs the computational imaging camera 101 to capture an image (step S117).

Next, the computational imaging camera 101 captures an image according to the instruction of the controller 108 (step S118). The captured image (second image) is input from the computational imaging camera 101 into the computational imaging information acquisition unit 103.

Subsequently, the computational imaging information acquisition unit 103 creates a difference image between the first image and the second image (step S119). Acquiring the difference image between the first image when the light emitter 109 is turned on and the second image when the light emitter 109 is turned off as described above enables acquiring a PSF being an image of only the light emitter 109 in a lighting state without being affected by another subject in the environment.

Next, the computational imaging information acquisition unit 103 acquires the created difference image as computational imaging information of the computational imaging camera 101 (step S120).

When the PSF is used as the computational imaging information as described above, the computational imaging camera 101 captures two images of a scene in which the light emitter 109 is turned on and a scene in which the light emitter 109 is turned off. The image in a lighting state and the image in a non-lighting state at this time are desirably captured in a time difference as little as possible.

Figure 8A:
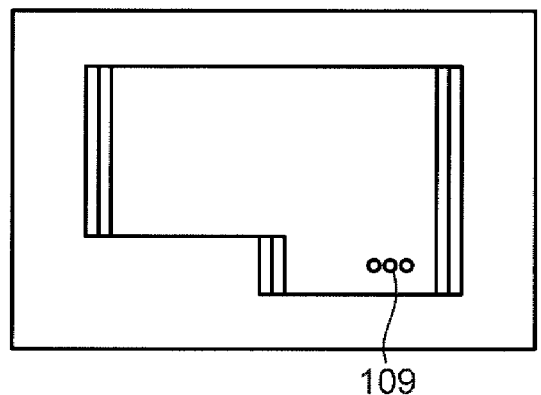
FIG. 8A is a diagram for illustrating creation processing of a difference image.
Figure 8B:
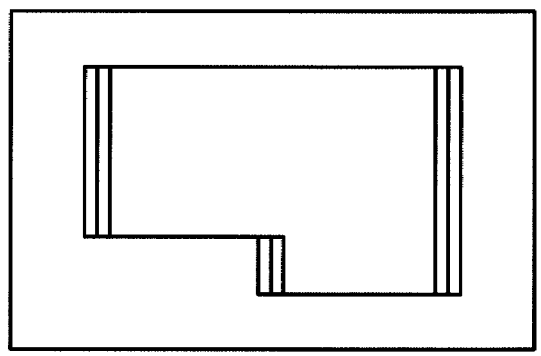
FIG. 8B is a diagram for illustrating creation processing of a difference image.
Figure 8C:
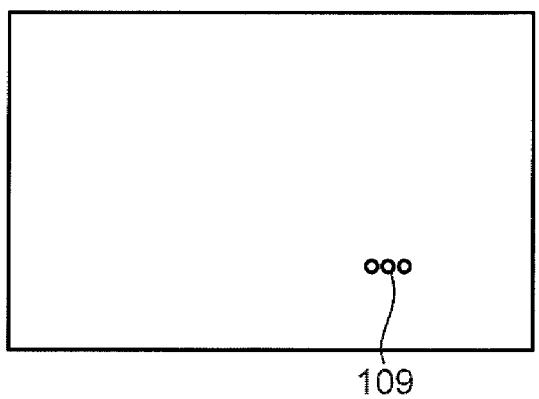
FIG. 8C is a diagram for illustrating creation processing of a difference image.

FIGS. 8A to 8C are each a diagram for illustrating creation processing of a difference image. FIG. 8A is an image captured by the computational imaging camera 101 when the light emitter 109 is turned on. It can be seen that the light emitter 109 has a high luminance value. FIG. 8B is an image captured by the computational imaging camera 101 when the light emitter 109 is turned off. It can be seen that the light emitter 109 has a lower luminance value than that when the light emitter 109 is turned on. FIG. 8C illustrates a difference image obtained by subtracting FIG. 8B, which is the image captured by the computational imaging camera 101 when the light emitter 109 is turned off, from FIG. 8A, which is the image captured by the computational imaging camera 101 when the light emitter 109 is turned off. Because only the light emitter 109 serving as a point light source is photographed without being affected by a subject other than the light emitter 109, it can be seen that the PSF can be acquired.

When an LTM is used as computational imaging information, multiple light emitters 109 dispersedly disposed in the environment may be used to acquire PSFs at multiple positions, and the PSFs may be used as the LTM.

Figure 10:
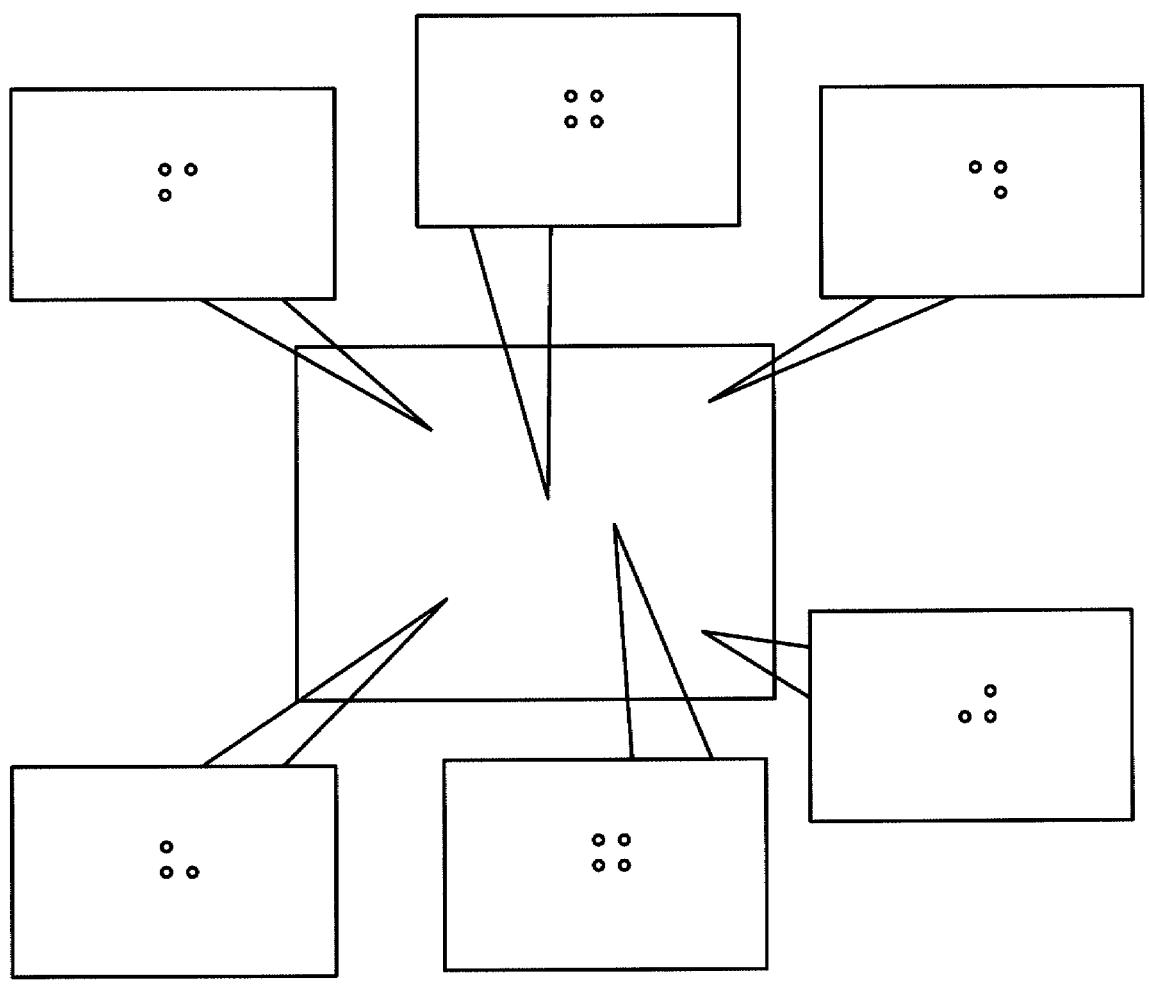
FIG. 10 is a schematic diagram illustrating multiple point spread functions (PSFs).

FIG. 9 is a flowchart illustrating a procedure of main processing of the computational imaging information acquisition unit 103 when an LTM is used as computational imaging information. First, PSFs corresponding to the respective light emitters 109 are acquired (step S301). The PSFs each may be acquired by using a difference image between an image when corresponding one of the light emitters 109 is turned on and an image when it is turned off as described above. This processing enables acquiring the PSFs at respective multiple positions on the image. FIG. 10 is a schematic diagram illustrating multiple PSFs acquired as described above. This example shows that the PSFs are acquired at six points on the image.

The computational imaging information acquisition unit 103 calculates the PSFs in all pixels of the image by performing interpolation processing on the multiple PSFs acquired as described above, and sets the PSFs as the LTM (step S302). The interpolation processing above may use general image processing such as morphing. The light emitter 109 may be a light of a smartphone or a mobile phone of a user. In this case, the user may turn on or off the light emitter 109 instead of the controller 108.

When the LTM is used as the computational imaging information, a small number of light emitters 109 may be used to change the light emitters 109 in position by moving them instead of disposing a large number of light emitters 109. This processing may be implemented by using a light of a smartphone or a mobile phone as the light emitter 109, and turning on and off the light while a user changes its location, for example. Alternatively, an LED mounted on a moving body such as a drone or a vacuum cleaner robot may be used. Additionally, the light emitter 109 on the computational image may be changed in position by installing the computational imaging camera 101 on a moving body or the like, or allowing a user to change a direction and a position of the computational imaging camera 101.

The image identification system 11 according to the present embodiment is configured such that the computational imaging information of the computational imaging camera 101 (first camera) is a difference image between the first image including the point light source in a lighting state and the second image including the point light source in a non-lighting state. Thus, the computational imaging information of the computational imaging camera 101 to be actually used can be accurately acquired without being affected by the subject other than the point light source. This configuration enables the corrected image (fourth image), which is to be used for machine learning, to be accurately generated based on the computational imaging information and the normal image (third image).

Additionally, the controller 108 of the learning device 21 controls operation of the light emitter 109 and the computational imaging camera 101 to enable timing of turning on or off the light emitter 109 and timing of imaging with the computational imaging camera 101 to be accurately synchronized.

Third Embodiment

Figure 11:
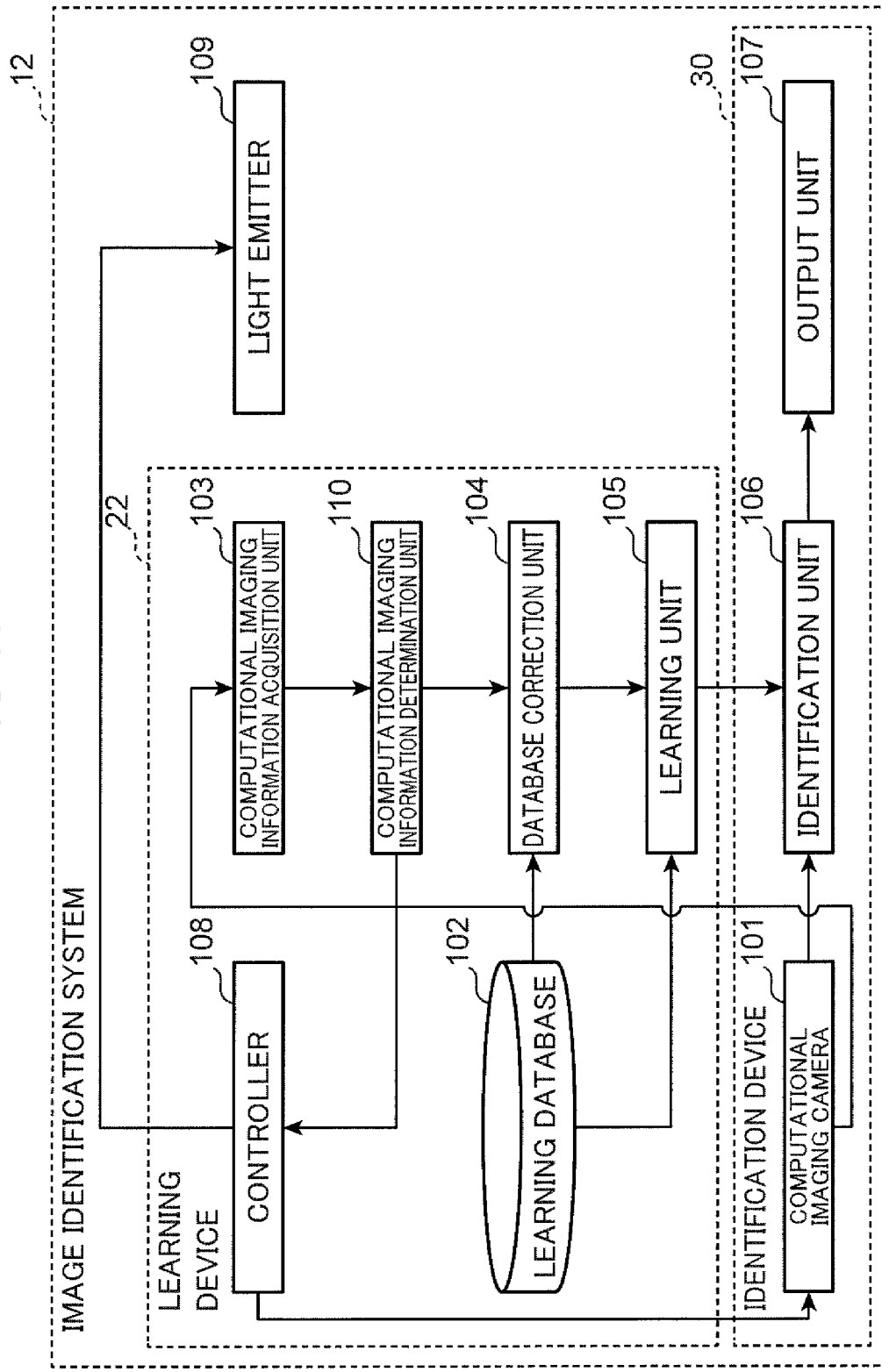
FIG. 11 is a schematic diagram illustrating a configuration of an image identification system according to a third embodiment.

FIG. 11 is a schematic diagram illustrating a configuration of an image identification system 12 according to a third embodiment of the present disclosure. FIG. 11 illustrates the same components as those in FIG. 6 that are denoted by the same corresponding reference numerals as those in FIG. 6, and that are not described. The image identification system 12 includes a learning device 22 including a computational imaging information determination unit 110. The computational imaging information determination unit 110 determines a state of image quality of computational imaging information acquired by a computational imaging information acquisition unit 103. The learning device 22 switches contents of processing depending on a determination result of the computational imaging information determination unit 110.

Figure 12:
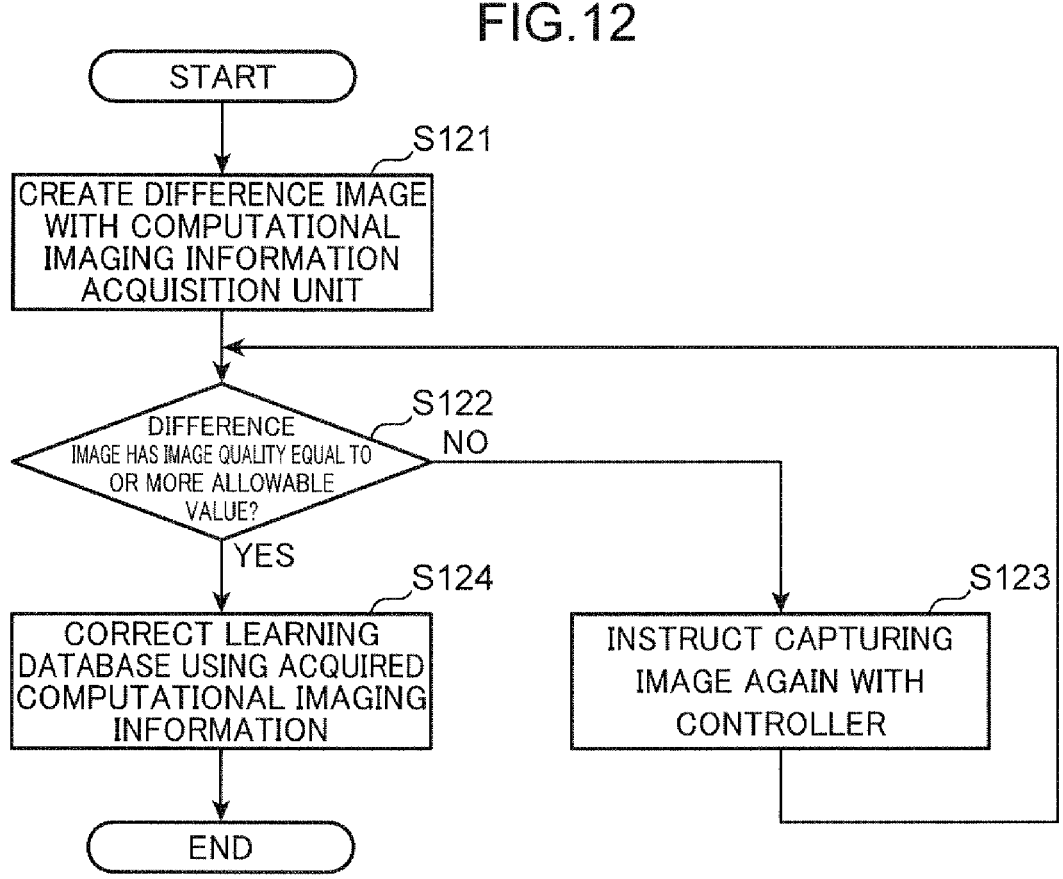
FIG. 12 is a flowchart illustrating a procedure of main processing of an image identification system.

FIG. 12 is a flowchart illustrating a procedure of main processing of the image identification system 12. The flowchart illustrates a flow of processing before and after processing of determining image quality with the computational imaging information determination unit 110.

First, the computational imaging information acquisition unit 103 creates a difference image between a first image when a light emitter 109 is turned on and a second image when the light emitter is turned off by a method similar to that in step S119 (FIG. 7) of the second embodiment (step S121).

Next, the computational imaging information determination unit 110 determines whether image quality of the difference image created by the computational imaging information acquisition unit 103 is an allowable value or more (step S122). The difference image between an image in a lighting state and an image in a non-lighting state is used because nothing other than a point light source needs to be shown in a PSF. Unfortunately, when there is a change in scene such as a large movement of a person or a dramatic change in brightness in environment between photographing in a lighting state and photographing in a non-lighting state, the change appears in the difference image, and thus an accurate PSF cannot be acquired. Thus, the computational imaging information determination unit 110 counts the number of pixels having luminance of a certain value or more in the difference image to determine that the PSF has image quality less than the allowable value when the number of pixels is equal to or more than a threshold, and determine that the PSF has image quality equal to or more than the allowable value when the number of pixels is less than the threshold.

When the computational imaging information determination unit 110 determines that the difference image has image quality less than the allowable value (step S122: NO), next, the controller 108 instructs the light emitter 109 to emit light and turn off the light, and instructs the computational imaging camera 101 to capture an image again (step S123). In contrast, when the computational imaging information determination unit 110 determines that the difference image has image quality equal to or higher than the allowable value (step S122: YES), next, the database correction unit 104 corrects a learning database 102 using the computational imaging information (PSF) acquired as the difference image by the computational imaging information acquisition unit 103 (step S124).

Here, it is conceivable that inappropriate setting of the computational imaging camera 101 is one of causes of deterioration in image quality of the difference image. For example, too short exposure time of the computational imaging camera 101 or too small gain of signal amplification causes not only an image to be dark as a whole, but also luminance of the light emitter 109 to be buried in noise. Conversely, too long exposure time of the computational imaging camera 101 or too large gain of the signal amplification causes not only a high luminance region in an image to have a luminance value exceeding an upper limit value of a sensing range but also the luminance to be saturated, and thus causing a so-called overexposure state around the light emitter 109. Thus, the computational imaging information determination unit 110 may check a maximum luminance value of each image when the light emitter 109 is turned on and off to determine that the difference image has image quality less than the allowable value when the maximum luminance value exceeds the upper limit value or is less than a lower limit value, or when the maximum luminance value is out of a predetermined range. The computational imaging information determination unit 110 determines the image quality of the difference image based on whether the image when the light emitter 109 is turned on has a maximum luminance value exceeding the upper limit value, and thus enabling determination whether the light emitter 109 has luminance exceeding the sensing range and the luminance is saturated. The computational imaging information determination unit 110 also determines the image quality of the difference image based on whether the image when the light emitter 109 is turned on has a maximum luminance value less than the lower limit value, and thus enabling determination whether the light emitter 109 has luminance buried in noise. When it is determined that the light emitter 109 has luminance saturated or buried in noise, the controller 108 may control the computational imaging camera 101 to change its setting so that a maximum luminance value falls within the predetermined range to capture an image again.

Figure 13:
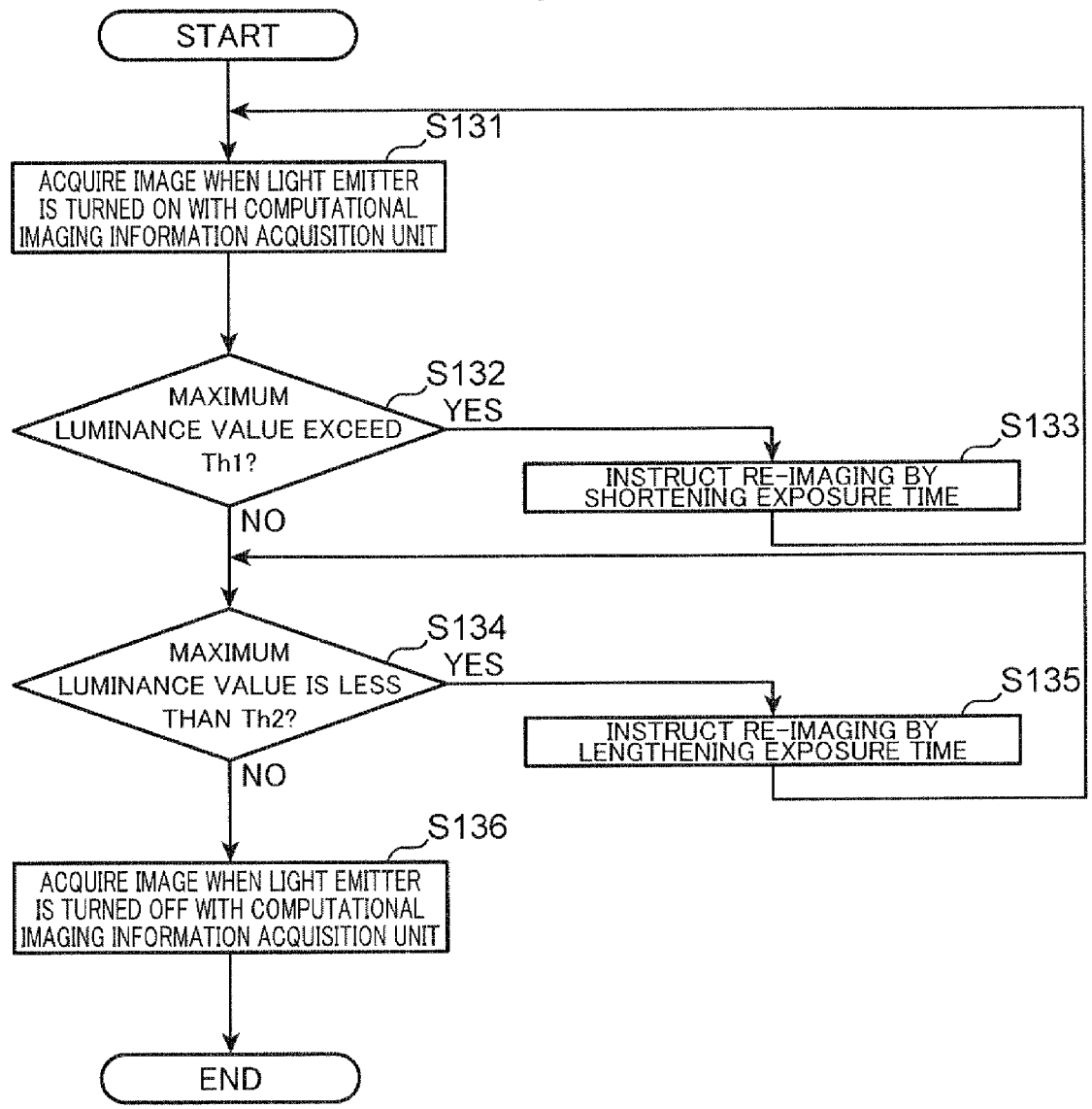
FIG. 13 is a flowchart illustrating a procedure of main processing of an image identification system.

FIG. 13 is a flowchart illustrating a procedure of main processing of the image identification system 12. The flowchart illustrates a flow of processing before and after processing of determining image quality with the computational imaging information determination unit 110.

First, the computational imaging information acquisition unit 103 acquires the first image captured by the computational imaging camera 101 when the light emitter 109 is turned on (step S131).

Next, the computational imaging information determination unit 110 checks whether the first image acquired by the computational imaging information acquisition unit 103 has a maximum luminance value exceeding an upper limit value Th1, thereby determining whether the luminance of the image is saturated (step S132).

When the maximum luminance value exceeds the upper limit value Th1, or when the luminance of the image is saturated (step S132: YES), next, the controller 108 instructs the computational imaging camera 101 to capture an image again by shortening the exposure time (step S133). In contrast, when the maximum luminance value is equal to or less than the upper limit value Th1 (step S132: NO), next, the computational imaging information determination unit 110 determines whether the light emitter 109 has luminance buried in noise by checking whether the first image acquired by the computational imaging information acquisition unit 103 has a maximum luminance value less than a lower limit value Th2 (step S134).

When the maximum luminance value is less than the lower limit value Th2, or when the luminance of the light emitter 109 is buried in noise (step S134: YES), next, the controller 108 instructs the computational imaging camera 101 to capture an image again by lengthening the exposure time (step S135). In contrast, when the maximum luminance value is more than or equal to the lower limit value Th2 (step S134: NO), next, the computational imaging information determination unit 110 determines that the first image acquired by the computational imaging information acquisition unit 103 has sufficiently high image quality with current exposure time. In this case, the controller 108 instructs the light emitter 109 to be turned off, and instructs the computational imaging camera 101 to capture an image with the current exposure time. As a result, the computational imaging information acquisition unit 103 acquires a second image when the light emitter 109 is turned off (step S136). The controller 108 may also control the exposure time of the computational imaging camera 101 so that the acquired second image has a maximum luminance value within a predetermined range as with the first image described above.

As a matter of course, the controller 108 may change setting other than the exposure time of the computational imaging camera 101. For example, gain may be changed.

Figure 14:
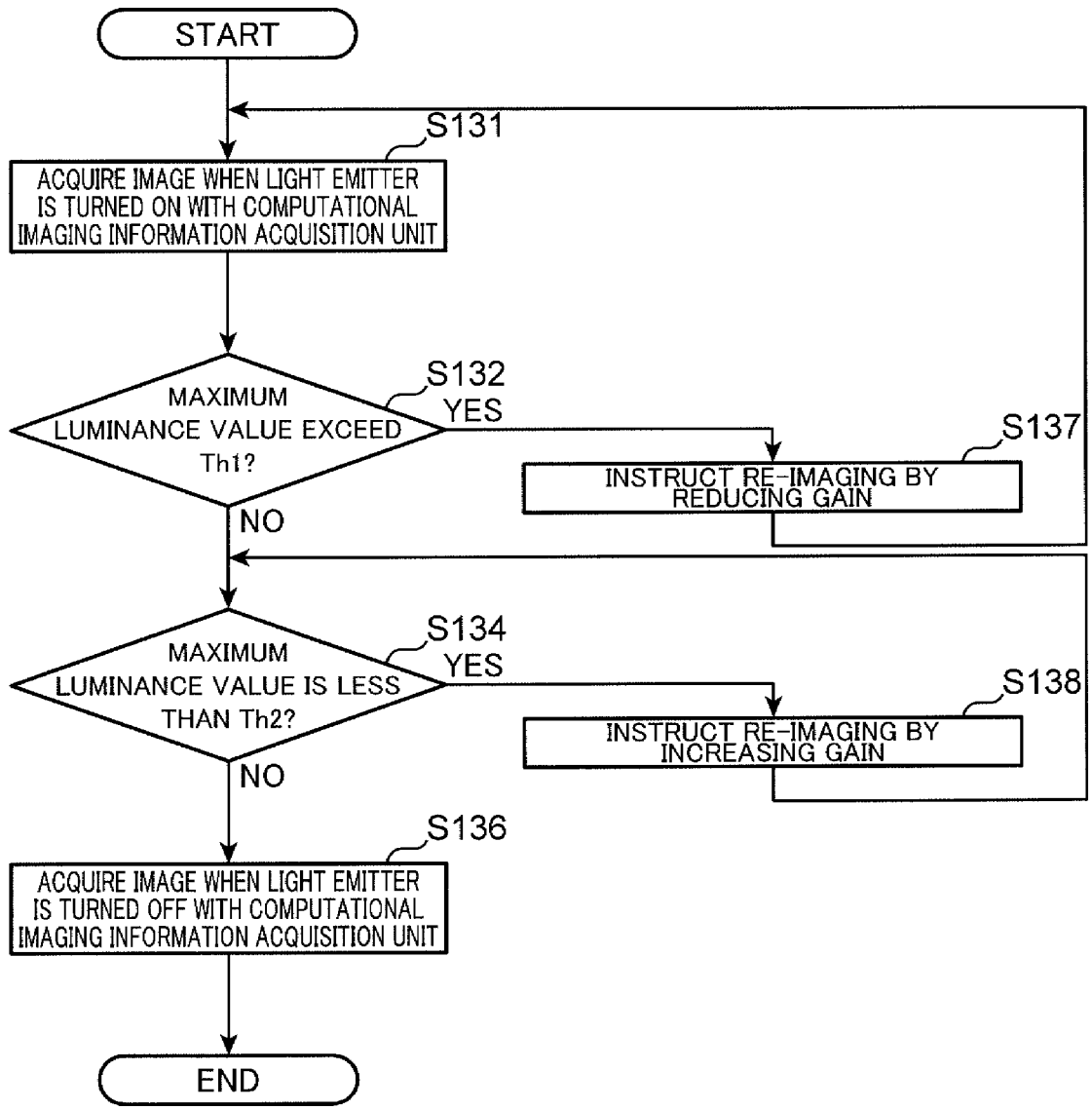
FIG. 14 is a flowchart illustrating a procedure of main processing of an image identification system.

FIG. 14 is a flowchart illustrating a procedure of main processing of the image identification system 12. The flowchart illustrates a flow of processing before and after processing of determining image quality with the computational imaging information determination unit 110.

When the maximum luminance value exceeds the upper limit value Th1, or when the luminance of the image is saturated in the determination in step S132 (step S132: YES), next, the controller 108 instructs the computational imaging camera 101 to capture an image again by reducing the gain (step S137).

When the maximum luminance value is less than the lower limit value Th2, or when the luminance of the light emitter 109 is buried in noise in the determination in step S134 (step S134: YES), next, the controller 108 instructs the computational imaging camera 101 to capture an image again by increasing the gain (step S138).

The controller 108 may control luminance of the light emitter 109 instead of the exposure time or gain of the computational imaging camera 101. That is, when the computational imaging information determination unit 110 determines that the luminance of the light emitter 109 is saturated, the controller 108 controls the light emitter 109 to reduce the luminance. Conversely, when the computational imaging information determination unit 110 determines that the luminance of the light emitter 109 is buried in noise, the controller 108 controls the light emitter 109 to increase the luminance. Increasing the luminance of the light emitter 109 increases a luminance difference from the noise.

When the computational imaging information determination unit 110 determines that the difference image has image quality less than the allowable value, the controller 108 may select another light emitter existing in the target area and instruct the other light emitter to emit light and turn off the light. This configuration is effective for a light source having directivity because image quality inevitably deteriorates depending on a positional relationship between the computational imaging camera 101 and the light emitter 109 when the light source having directivity is used.

The image identification system 12 according to the present embodiment causes the controller 108 to perform re-imaging control on the computational imaging camera 101 when the difference image has image quality less than the allowable value, and thus enables acquiring a difference image using a point light source in which a luminance value is appropriately adjusted. As a result, appropriate computational imaging information of the computational imaging camera 101 can be acquired.

The controller 108 performs the re-imaging control to correct at least one of the exposure time and the gain of the computational imaging camera 101, and thus enables acquiring the difference image using the point light source in which the luminance value of is appropriately adjusted.

Fourth Embodiment

Figure 15:
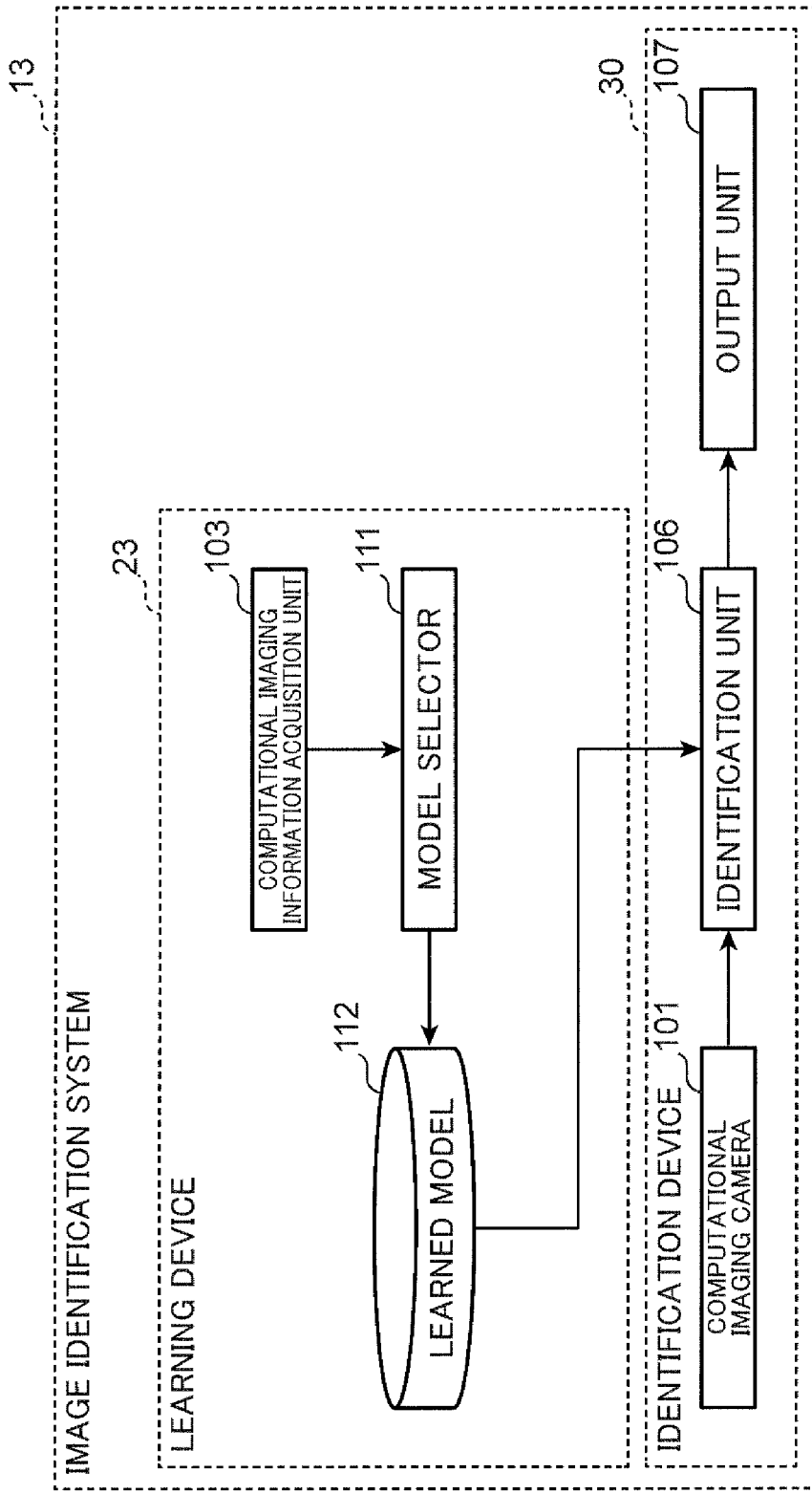
FIG. 15 is a schematic diagram illustrating a configuration of an image identification system according to a fourth embodiment.

FIG. 15 is a schematic diagram illustrating a configuration of an image identification system 13 according to a fourth embodiment of the present disclosure. FIG. 15 illustrates the same components as those in FIG. 1 that are denoted by the same corresponding reference numerals as those in FIG. 1, and that are not described. The image identification system 13 includes a learning device 23 including a storage unit 112 that stores multiple learned image identification models, and a model selector 111 that selects one image identification model from among the multiple image identification models. The learning device 23 of the image identification system 13 includes the model selector 111 instead of a learning unit 105 learning a learning database 102 corrected by a database correction unit 104, and selects an optimal image identification model corresponding to computational imaging information of a computational imaging camera 101 from multiple image identification models learned in advance. For example, when multiple types of a multi-pinhole mask 301a different in a mask pattern are prepared in advance as described above, an image identification model learned using a captured image in a state with each of the multi-pinhole mask 301a mounted is created in advance, and then multiple image identification models created in advance are stored in the storage unit 112. The model selector 111 selects one image identification model corresponding to the computational imaging information of the computational imaging camera 101 from among the multiple image identification models stored in the storage unit 112.

Figure 16:
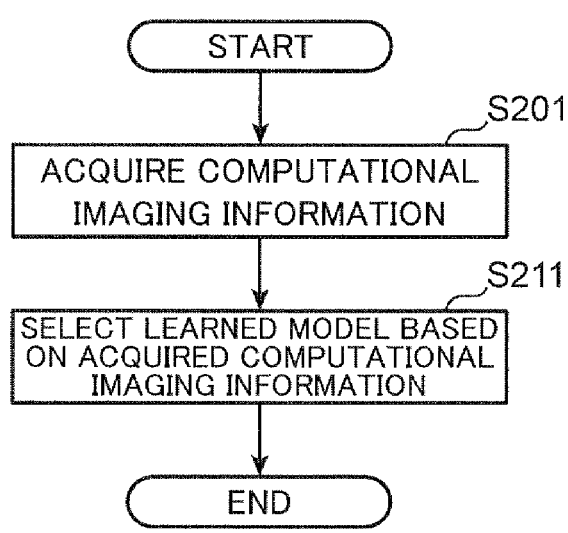
FIG. 16 is a flowchart illustrating a procedure of main processing of a learning device.

FIG. 16 is a flowchart illustrating a procedure of main processing of the learning device 23 of the image identification system 13. The flowchart illustrates a flow of processing in which the model selector 111 selects an image identification model.

First, the computational imaging information acquisition unit 103 acquires computational imaging information of the computational imaging camera 101 (step S201).

Next, the model selector 111 selects one image identification model corresponding to the computational imaging information acquired by the computational imaging information acquisition unit 103 from among the multiple image identification models stored in the storage unit 112 (step S211). In this processing, image identification models learned with various types of computational imaging information may be prepared in advance, and an image identification model learned with computational imaging information closest to the acquired computational imaging information may be selected.

The image identification model selected as described above is suitable for the computational imaging camera 101. The selected image identification model is set in an identification unit 106 as an image identification model used by the identification unit 106. The identification unit 106 can perform highly accurate identification processing by using the image identification model.

The image identification system 13 according to the present embodiment causes the learning device 23 to select one image identification model corresponding to the computational imaging information of the computational imaging camera 101 from among the multiple learned image identification models. Thus, the learning device 23 does not need to newly perform learning, thereby enabling reduction in processing load of the learning device 23, and also earlier start of operation of the identification device 30.

INDUSTRIAL APPLICABILITY

The learning method and the identification method according to the present disclosure are particularly useful for an image identification system in an environment requiring privacy protection of a subject.

The invention claimed is:

1. A learning method comprising, by an information processing device serving as a learning device:
   acquiring computational imaging information of a first camera that captures images with blurring, the computational imaging information being a difference image between a first image and a second image that are captured by the first camera, the first image including a point light source in a lighting state and the second image including the point light source in a non-lighting state;
   acquiring a third image captured by a second camera, and a correct answer label assigned to the third image;
   generating a fourth image by correcting the third image to match the computational imaging information of the first camera; and
   performing machine learning using the fourth image and the correct answer label to create an image identification model for identifying an image captured by the first camera, wherein
   the images with blurring include a superimposed image made up of multiple images with different viewpoints, and
   the third image includes a subject which is captured by the second camera and focused.

2. The learning method according to claim 1, wherein the first camera is any one of:
   a coded aperture camera including a mask having a mask pattern with a transmittance different for each region;
   a multi-pinhole camera including a mask having a mask pattern in which multiple pinholes are formed and an image sensor with a light receiving surface on which the mask is disposed; and
   a light-field camera that acquires a light field from a subject.

3. The learning method according to claim 2, wherein the mask of the coded aperture camera or the multi-pinhole camera is changeable to another mask having a different mask pattern.

4. The learning method according to claim 1, wherein the first camera includes no optical system that forms an image of light from a subject on an image sensor.

5. The learning method according to claim 1, wherein the computational imaging information is any one of a point spread function and a light transport matrix.

6. The learning method according to claim 1, wherein the information processing device performs lighting control of the point light source and imaging control of the first image captured by the first camera, and performs non-lighting control of the point light source and imaging control of the second image captured by the first camera.

7. The learning method according to claim 6, wherein the information processing device performs re-imaging control of the first image and the second image captured by the first camera when the difference image includes an image quality less than an allowable value.

8. The learning method according to claim 7, wherein the information processing device corrects at least one of an exposure time or a gain of the first camera in the re-imaging control to cause each of the first image and the second image to have a maximum luminance value within a predetermined range.

9. An image identification method, comprising:
   in an identification device;
      allowing an identification unit, including a processor, to receive the images captured by the first camera that captures the images with blurring;
      identifying, by the processor of the identification unit, the image captured by the first camera based on the image identification model; and
      outputting a result of the identifying, by the processor of the identification unit,
   wherein the image identification model is created by the learning method according to claim 1.

10. The learning method according to claim 1, wherein the first camera includes an image sensor and a mask, with a mask pattern including multiple pinholes,
    the mask is a multi-pinhole mask disposed at a predetermined interval from a light-receiving surface of the image sensor,
    the light-receiving surface is configured to receive, among a first light that is received from a capture area of the first camera, a plurality of second lights that have passed through the multiple pinholes,
    the multiple pinhole images are multiple pinhole images corresponding to the plurality of second lights that are received at the light-receiving surface, and
    each of the multiple pinhole images includes a degree of blurring corresponding to a size of a corresponding one of the multiple pinholes.

11. A learning device, comprising:
    an acquisition unit, including a first processor, that acquires computational imaging information of a first camera that captures images with blurring, the computational imaging information being a difference image between a first image and a second image that are captured by the first camera, the first image including a point light source in a lighting state and the second image including the point light source in a non-lighting state;
    a storage that stores a third image captured by a second camera and a correct answer label assigned to the third image;
    an image generator that generates a fourth image by correcting the third image from the storage to match the computational imaging information of the first camera acquired by the acquisition unit; and
    a learning unit, including a second processor, that performs machine learning using the fourth image generated by the image generator and the correct answer label from the storage to create an image identification model for identifying an image captured by the first camera, wherein
    the images with blurring include a superimposed image made up of multiple images with different viewpoints, and
    the third image includes a subject which is captured by the second camera and focused.

12. An image identification system, comprising:
    an acquisition unit, including a first processor, that acquires computational imaging information of a first camera that captures images with blurring, the computational imaging information being a difference image between a first image and a second image that are captured by the first camera, the first image including a point light source in a lighting state and the second image including the point light source in a non-lighting state;

a storage that stores a third image captured by a second camera and a correct answer label assigned to the third image;

an image generator that generates a fourth image by correcting the third image read out from the storage unit to match the computational imaging information of the first camera acquired by the acquisition unit;

a learning unit, including a second processor, that performs machine learning using the fourth image generated by the image generator and the correct answer label from the storage to create an image identification model;

an identification unit, including a third processor, that identifies an image captured by the first camera based on the image identification model created by the learning unit; and an output that outputs an identification result of the identification unit, wherein the images with blurring include a superimposed image made up of multiple images with different viewpoints, and the third image includes a subject which is captured by the second camera and focused.

\* \* \* \* \*